United States Patent
Panwar et al.

(10) Patent No.: US 10,699,310 B1
(45) Date of Patent: Jun. 30, 2020

(54) NETWORK ROUTER HAVING SERVICE CARD

(71) Applicant: Juniper Networks, Inc., Sunnyvale, CA (US)

(72) Inventors: Ramesh Panwar, Pleasanton, CA (US); David Weinberg, Sacramento, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1086 days.

(21) Appl. No.: 15/152,482

(22) Filed: May 11, 2016

Related U.S. Application Data

(63) Continuation of application No. 12/698,891, filed on Feb. 2, 2010, now abandoned.

(60) Provisional application No. 61/183,090, filed on Jun. 2, 2009.

(51) Int. Cl.
 *G06Q 30/02* (2012.01)
 *H04L 12/721* (2013.01)
 *H04L 29/08* (2006.01)
 *H04L 9/32* (2006.01)

(52) U.S. Cl.
 CPC ..... *G06Q 30/0269* (2013.01); *G06Q 30/0277* (2013.01); *H04L 9/32* (2013.01); *H04L 45/44* (2013.01); *H04L 67/22* (2013.01); *H04L 67/306* (2013.01)

(58) Field of Classification Search
 CPC ..................................................... G06Q 30/02
 See application file for complete search history.

(56) References Cited

U.S. PATENT DOCUMENTS

| | | |
|---|---|---|
| 6,266,704 B1 | 7/2001 | Reed et al. |
| 6,496,931 B1 | 12/2002 | Rajchel et al. |

(Continued)

OTHER PUBLICATIONS

A Gender study of Internet Web Browsing: Internet usage surveys compared to actual router data logs; by Kenneth W. Chalmers; Thesis, Utah State University, (2008) obtained by www.dialog.proquest.com (Year: 2008).*

(Continued)

*Primary Examiner* — Eric R Netzloff
*Assistant Examiner* — Michael R Stibley
(74) *Attorney, Agent, or Firm* — Shumaker & Sieffert, P.A.

(57) ABSTRACT

In general, techniques are disclosed to facilitate communicating within computer networks. For example, a layer three (L3) router including a service card and an interface card may be configured to perform the techniques. The interface card receives a query from a network that sources communications in accordance with a plurality of models. The query may specify a customer device and one of the sourced communications, and request that the service card select one of the models for the specified sourced communication and the specified customer device. The service card further stores data defining a profile for the one of the customer devices. The service card may also, in response to the query, analyze the profile data for the specified customer device to determine the selected one of the models for the specified sourced communication with respect to the specified customer device.

23 Claims, 15 Drawing Sheets

(56) References Cited

U.S. PATENT DOCUMENTS

| | | | |
|---|---|---|---|
| 6,771,673 B1* | 8/2004 | Baum | H04L 29/12009 370/535 |
| 6,785,226 B1 | 8/2004 | Oltman et al. | |
| 7,408,941 B2 | 8/2008 | Martini et al. | |
| 7,783,777 B1 | 8/2010 | Pabla et al. | |
| 8,285,590 B2 | 10/2012 | Evans | |
| 8,307,422 B2 | 11/2012 | Varadhan et al. | |
| 8,307,444 B1 | 11/2012 | Mayer et al. | |
| 8,468,271 B1 | 6/2013 | Panwar et al. | |
| 2002/0082923 A1 | 6/2002 | Merriman et al. | |
| 2002/0191619 A1 | 12/2002 | Shafer | |
| 2003/0004808 A1 | 1/2003 | Elhaoussine et al. | |
| 2004/0111640 A1 | 6/2004 | Baum | |
| 2004/0181540 A1 | 9/2004 | Jung et al. | |
| 2005/0097204 A1 | 5/2005 | Horowitz et al. | |
| 2006/0265507 A1 | 11/2006 | Banga et al. | |
| 2007/0027766 A1 | 2/2007 | Collins et al. | |
| 2007/0147363 A1 | 6/2007 | Oswal et al. | |
| 2008/0235351 A1 | 9/2008 | Banga et al. | |
| 2008/0255915 A1 | 10/2008 | Collins et al. | |
| 2008/0262901 A1 | 10/2008 | Banga et al. | |
| 2008/0288658 A1 | 11/2008 | Banga et al. | |
| 2009/0049192 A1 | 2/2009 | Banga et al. | |
| 2009/0132373 A1 | 5/2009 | Redlich | |
| 2009/0282468 A1 | 11/2009 | Banga et al. | |
| 2009/0327488 A1 | 12/2009 | Sampat et al. | |
| 2010/0023959 A1 | 1/2010 | Bugenhagen | |
| 2010/0262472 A1* | 10/2010 | Gautam | G06Q 30/02 705/14.1 |
| 2010/0285774 A1 | 11/2010 | Ginzboorg | |
| 2012/0246338 A1 | 9/2012 | Li | |

OTHER PUBLICATIONS

Router-based Traffic Engineering in MPLS/DiffServ/HMIP Radio Access Networks; by David A. Barlow; Thesis, Georgia Institute of Technology (Apr. 2002), obtained by www.dialog.proquest.com (Year: 2002).*

Reed, D. (2001). Back to the bottom line: Companies embarking on customer relationship management programmes face trouble, unless a clear return on investment programme has been formulated (special report: CRM) Centaur Communications Limited. Retrieved from http://dialog.proquest.com (Year: 2001).*

Office Action from U.S. Appl. No. 12/698,845, dated Nov. 25, 2016, 42 pp.

U.S. Appl. No. 12/698,891, filed Feb. 2, 2010 entitled Edge Advertisement Management System Providing Cost per Action Advertising Infrastructure Using Anonymous Data.

U.S. Appl. No. 12/698,863, filed Feb. 1, 2010 entitled Edge Advertisement Management System for Targeted Selection of Revenue Models for Online Advertising Using Anonymous Data.

U.S. Appl. No. 12/698,845, filed Feb. 2, 2010 entitled Last Mile Online Advertising Within Computer Networks Using Anonymous Data.

Prosecution History from U.S. Appl. No. 12/698,891, dated Jun. 26, 2013 through Feb. 11, 2016, 95 pp.

Prosecution History from U.S. Pat. No. 8,468,271, dated Jan. 17, 2013 through Mar. 20, 2013, 21 pp.

Prosecution History from U.S. Appl. No. 12/698,845, dated Mar. 15, 2013 through Jun. 6, 2016, 193 pp.

Prosecution History from U.S. Appl. No. 12/698,863, dated Apr. 19, 2013 through Aug. 5, 2016, 144 pp.

* cited by examiner

NETWORK ROUTER HAVING SERVICE CARD

RELATED APPLICATIONS

This application is a continuation of U.S. application Ser. No. 12/698,891, filed Feb. 2, 2010, which claims the benefit of U.S. Provisional Application No. 61/183,090, filed Jun. 2, 2009, the entire contents of each of which are incorporated herein by reference.

TECHNICAL FIELD

The invention relates to a network router and, more particularly, a service card installed within the network router.

BACKGROUND

Online advertising generally refers to advertising within computer networks. In this form of advertising, a potential purchaser typically direct a computing device, such as a desktop computer, a laptop computer, a mobile phone or so-called "smart" phone, or any other device capable of accessing a computer network, to access or otherwise browse a public network, such as the Internet. While browsing, one or more advertising networks (or, simply, "ad networks") provide the online advertisements (or "online ads" or, simply "ads") to the potential purchaser's computing device. The potential purchaser may then click on or otherwise select the online advertisement to retrieve and view a website with which the customer may interact to view and/or purchase a product (e.g., an item, good and/or service) offered by the selected advertisement. Electronic advertisements may also be presented to a potential purchaser using other media, such as by presenting the advertisements commensurate with electronic mail (email), text messages, digital multimedia, Voice of the Internet (VoIP) telephony sessions and other formats.

The ad networks and the advertising agents or other customers that place the ads engage in various forms of fee structures. For example, one form of a revenue model of an ad network is referred to as Cost-Per-thousand impressions ("CPM") in which the ad network charges advertisers a set or variable price each time an advertisement placed by that advertiser is shown to (i.e., makes an impression on) potential purchaser one thousand times. In another form of online advertising, an ad network uses a revenue model referred to as Cost-Per-Click ("CPC") in which the ad network charges the advertiser a set or variable price each time an advertisement for that company's product is "clicked" or selected by a potential customer, regardless of whether the potential customer actually purchased the product or took some other action. In yet another form of online advertising, the ad network may utilize a revenue model referred to as Cost-Per-Action ("CPA") in which the ad network charges the advertiser each time a potential customer clicks on the advertisement and subsequently completes an action or transaction, such as purchasing a product offered in the advertisement or signing up for more information regarding the product. Currently, CPA-based online advertising is implemented in a limited, per-website basis where a content provider has the infrastructure to work intimately with an advertising network due to the difficulty in correlating customer clicks with subsequent customer actions.

In many cases, ad networks attempt to garner information about the potential customer in order to select targeted ads and improve the likelihood of success of the ads. As one example, a network-based search engine may feed searches entered by the potential customers to an ad network, which selects and returns ads based on the subject of the entered search. The advertisements are then presented to the potential customer along side the results of the search. Thus, unlike conventional advertising where collection of data concerning customer behavior is limited (as in radio or television advertising), online advertising may facilitate more targeted advertising by way of dynamic and often real-time collection of data regarding customer behavior.

In some cases an ad network may deploy more invasive means that seek to record the potential customer's actions over time. Often this data is recorded by use of cookies inserted onto the potential customer's device. Often without the knowledge of the potential customer, the cookies are subsequently uploaded to a given search engine, website, or ad network the potential customer enters a search, browses a website, or retrieves an advertisement. The information recorded over time by way of the cookies may allow the ad network to determine the frequency with which the potential customer has entered various search terms and other metrics related to searching or browsing the public network, such as behavior regarding selection of related advertisements.

Each of the different ad networks may deploy different technologies and attempt to compile their own information concerning the behavior of the potential customer with respect to domains serviced by that ad network. That is, each ad networks may deploy its own cookies in an attempt to collect this potential customer information, and the potential customer's computing device returns the ad network's cookie when the unsuspecting potential customer encounters that ad network's domain. In this respect, a user's behavior and actions with respect the resources of a public network may be monitored by many different ad networks. As the cookies of the different ad networks are domain limited, individual ad networks may be limited in their ability to compile a comprehensive view of any given potential customer across domains. However, when viewed as a whole, the ad networks may compile significant information regarding the network users' behavior, thereby compromising user privacy.

A number of different ad networks have developed various services with which network-based media companies (so-called "publishers") may interact to traffic, target, deliver and report on their interactive, online advertising campaigns. Each of these various ad networks may charge the advertisers different rates for each form of online advertising, e.g., CPM, CPC and CPA, and service different scopes of the public network. These different scopes may translate into different audiences. In some cases, a company or other enterprise operating a search engine may also own and operate its own ad network. In this case, the search engine provides an interface for monitoring the behavior of potential customers and utilizes this information to drive its own ad network. In this business model, search engines therefore compete with one another for ad revenue and typically exclude competing ad networks, as this detracts from their own ad revenue.

Considering these varying scopes, advertisers or advertisement agencies that place ads on behalf of their clients may be forced to contract with a number of these different ad networks and search engines to reach a wider audience. The ad agencies may attempt to select between the numerous ad networks and search engines based on its limited data and previous interactions with the ad networks. The ad agency may also consider cost and other factors when selecting these ad networks. In some cases an ad agency may be forced to contract with the ad network that captures the proportionally largest segment of the target audience regardless of cost.

Thus, although online advertising provides a number of benefits over brick and mortar or conventional forms of advertising, it currently suffers from many problems and disadvantages. For example, the rather invasive means currently employed by the ad networks may lead to compromised privacy of the network users. Moreover, from the perspective of the ad network, current techniques allow any individual ad network to compile only a fragmented view of user behavior based on that user's interaction with the ad network's domain. Further, advertising agencies or other clients placing the ads are forced with the difficult challenge of selecting between the numerous ad networks and search engines as well the various fee structures offered by the different ad networks.

SUMMARY

In general, techniques are described for performing last mile online advertising that ensures privacy of network users yet allows for improved advertising services. Last mile online advertising involves services deployed proximate a network user, where the term "last mile" refers generally to infrastructure deployed at or in communication with one or more edge service provider networks. As one example, rather than rely on domain-specific cookies currently used by the numerous ad networks that are located at the "first mile" of the public network (i.e., remote from the network users), the last mile online advertising techniques described herein may enable information collection across domains. Once collected, the information may be condensed into a customer profile that more accurately reflects customer interests, actions and behavior, as this information is not limited to a single ad network domain. Yet, the information may be collected in such a way that customer privacy is maintained. With the rising sensitivity of customers to issues of privacy, the last mile online advertising techniques described herein may alleviate these privacy concerns by masking or otherwise scrambling the customer identity associated with this information.

In operation, an edge advertisement management system (EAMS) is deployed at or in communication with network infrastructure of a service provider network. One or more routers located within service provider network receive network communications from customer devices utilizing the service provider network to provide network access. The routers forward the communications or portions thereof to the EAMS, which in turn removes any application-layer cookies from the network communications to preserve the privacy of the customers of the service provider network. Often, these cookies are "first mile" cookies set by an ad network, search engine or other domain, and the cookies frequently include information that allows for the positive identification of the customer or customer's device. The EAMS may replace any removed cookies with standardized application layer cookies that complies with a data format that excludes information identifying the customers that originated the network communication. This standardized cookie may be referred to herein as a "last mile" cookie to denote that the cookie was generated from information collected proximate to the customer devices and the service provider network.

For example, the EAMS may parse the network communications from the router(s) of the service provider network to extract application-layer information concerning the customer interests, actions and/or behavior and store this information to a history database. This information may be organized by customer and time in a manner that reflects a transaction log for each of the customers of the service provider network. From this history database, the EAMS may generate a profile that forms the basis of the standardized application-layer cookie that maintains user privacy yet more accurately describes the customer interests, actions and/or behavior based on interactions that span domains and content providers.

Notably, various services traditionally offered over disparate networks, such as telephone or voice services, television or video services, Internet or data services and mobile services, have recently begun to be offered over a single packet-switched or Internet Protocol (IP) based network. The network convergence within service provider networks may facilitate monitoring of network communications across these various services, which also may be referred to as channels in this disclosure. Consequently, the EAMS may monitor network communications across services and channels, where previously such monitoring was not provided without specialized hardware. The "last mile" cookies of the EAMS that replaces the use of "first mile" cookies of the various ad networks may therefore include information concerning customer behavior that both spans network domains and media channels. As a result, the EAMS may provide more visibility into a customer's behavior, which may significantly improve an ad network's ability to target particular customers.

To maintain privacy, the EAMS may generate temporary identities that represents pseudonyms for the customers of the service provider network. The EAMS generates this pseudonym by, in one example, performing a one-way hash on a Media Access Control (MAC) address assigned to the customer device from which the network communication was originated. This one-way hash may obscure the identity of the customer device and thereby mask or otherwise scramble the identity of the customer device for which the above profile was determined. The EAMS may then insert the above referenced application layer cookie into the network communication, where this cookie specifies the profile and the untraceable pseudonym. Effectively, the EAMS replaces the "first mile" cookie with a "last mile" cookie to provide more accurate information concerning a given customer's behavior while simultaneously addressing privacy concerns associated with cookies in general. The EAMS then forwards this network communication including the inserted application layer cookie from the service provider network to the network destination.

The network destination may comprise an online retailer, search engine, content publisher or any other destination within a public network. This network destination may generally be referred to herein as a content provider insomuch that an online retailer, search engine, and content publisher all serve content. The network destination may also comprise an ad network. Assuming the network destination comprises an ad network, the ad network extracts the cookie and utilizes the cookie to select an ad that targets the customer for inclusion within the webpage. However, the EAMS may generate a new or different pseudonym for the same customer for each request and thereby not permit the ad network to track or positively identify the customer. Conceptually, the EAMS may randomly pull a pseudonym from an identity pool and use that identity for a short term basis to mask the actual customer identity, e.g., Media Access Control (MAC) address.

Moreover, the EAMS may, in some instances, encrypt this last mile cookie and only allow those ad networks and other domains that subscribe to the last mile advertisement service offered by the EAMS to decrypt the last mile cookie. This encryption may further protect customers from any unwanted privacy invasions. The EAMS may be configurable to enable or disable this encryption on a per customer basis, as well as, per website, domain or other basis to accommodate a wide range of tolerances toward privacy concerns by customers.

The EAMS may provide these services in a manner that varies according to subscriptions levels. These various subscription levels may influence the profile data included within a given cookie by the EAMS. To illustrate, a first ad network may subscribe to a premium level of the subscription services offered by the EAMS. In such a case, the EAMS may include within communications directed from a customer of the service provider network to the first ad network cookies containing profile data of high granularity that accurately describes the recent behavior of that customer. This higher granularity data may enable more accurate targeted advertising by this first ad network. In contrast, a second ad network may subscribe at a lower level of the subscription service, such as a basic level, and EAMS may determine profile data at a lower granularity that may more generally describes customer behavior over a more generalized geographical region or time period for example. Consequently, the EAMS may generate last mile cookies that address a particular ad network's level of subscription which may facilitate various advertising goals of ad networks and cost structures for sourcing ads for ad agencies.

The EAMS may further leverage the profile and history databases to provide various services to ad networks and ad agencies in accordance with correlation and evaluation aspects of the last mile online advertising techniques described in this disclosure. As one example, the EAMS may include Cost-Per-Action (CPA) infrastructure that correlates customer "clicks" or selections of advertisements with actions, such as purchases of products (e.g., goods, items and/or services) offered in the advertisement, signing up for additional information, or any other typical online advertising action. As the EAMS may accurately track both clicks and actions across all domains due to the EAMS tracking at the last mile rather than the first mile, the EAMS may substantially improve the correlations of "clicks" with actions. The EAMS may provide this click correlation service as an additional service to ad networks and ad agencies such that ad networks may improve revenue capture with respect to advertisements sourced or placed in accordance with the Cost-Per-Action (CPA) revenue model and the ad agencies may select between ad networks and fee structures with improve knowledge.

The EAMS may also, by virtue of the increased visibility provided by the more comprehensive profile and history databases, allow for the more accurate evaluation of the effectiveness of each of the ad networks with respect to ad placement. During the click correlation process, the EAMS may correlate clicks with actions but, in some instances, the EAMS may additionally correlate clicks with past selections in general. As a result, the EAMS may, as one example, identify when a customer does not select an advertisement, which may be relevant when determining the effectiveness of ads placed under the CPC or CPA revenue models. Moreover, the EAMS may monitor the presentation of all advertisements, even those that are placed under the CPM revenue model and, by virtue of the increased visibility, more accurately correlate these advertisements with eventual actions. The EAMS may store this metadata to a metadata database and provide an interface by which ad agencies may interact with this metadata database. The EAMS may therefore provide a more accurate form of metadata by which ad agencies may evaluate the effectiveness of ad networks in placing various advertisements.

The EAMS may also leverage the profile, history, correlation and metadata databases to source ads and thereby operate as an interface point for ad networks at the last mile rather than the first mile. In some cases, the EAMS may itself operate as a last mile ad network. In this ad sourcing aspect of the last mile online advertising techniques, the EAMS may automate much of the ad sourcing procedure and thereby simplify ad sourcing on behalf of ad agencies. The agency interface described above may be extended to enable agencies to interface with the EAMS and upload, edit, delete and otherwise manage online advertisements. The EAMS may also provide an interface to enable content providers to upload, edit, delete and otherwise manage inventory (e.g., available ad space). As the EAMS may access multiple channels or services, this inventory may comprise inventory from video content providers, voice content providers, mobile content providers, and data content providers. The EAMS may then dynamically source advertisements using the profile, history and metadata databases to match advertisements to inventory for a particular customer.

Considering the improved visibility to customer behavior as described above, the EAMS may match a particular one of the advertisements to inventory in a manner that may more accurately target the customer. Moreover, as the EAMS may include inventory from numerous channels, the EAMS may source ads across channels. Also, the EAMS may utilize the metadata database, in this instance, to store metadata defining the effectiveness of inventory and, in the aggregate, content providers, rather than ad networks. The EAMS may then automatically or without any user or operator input improve the matching based on the metadata stored to the metadata database. Furthermore, the EAMS may leverage the correlation database to facilitate placement of ads under the CPA revenue model even though particular portions of various services may not offer a way to capture actions themselves.

In yet another aspect of the techniques described herein and referred to as the mass-customizable advertisement aspect, the EAMS may provide for mass-customizable advertisements. These advertisements may include an advertisement template having at least one customizable template region. These advertisements may also comprise a plurality of template data, each of which is associated with one or more keywords or tags. The EAMS may enable ad agencies to specify a mass-customizable advertisement via the agency interface. Upon matching one of these advertisements to an inventory when receiving a request for an advertisement from a customer device, the EAMS may select one of the plurality of template data to populate the customizable template region. The EAMS may base this selection on the tags associated with each of the template data and the profile associated with the customer device, as well as, other information. In this respect, the EAMS may not only intelligently and automatically source ads to more effectively target a particular customer, but may also intelligently and automatically adapt the content of ads to more further target this customer.

In one embodiment, a system comprises an advertisement network that sources electronic advertisements placed by at least one advertisement agency, a service provider network that provides a plurality of customers network access to a public network having network destinations that source content, wherein the advertisement directs the one of the customer devices to a first one of the network destinations that resides in a first domain when selected by a customer operating the one of the customer devices, and a edge advertisement management system (EAMS) configured to communicate with the network device. The service provider network receives network communications from the customers and forward the network communications to the EAMS. The EAMS comprises a condensation services layer configured to process the forwarded network communications from the network device and maintain a transaction log for each of the plurality of customer devices of the service provider network, wherein the transaction log for each of the customers includes entries listing those of the electronic advertisements selected by a customer operating the respective customer devices, and a correlation layer that correlates those of the network communications from the customer devices committing to an action with any of the electronic advertisements previously presented to the customers.

In another embodiment, a network device is configured to communicate with an edge network device located at an edge of a service provider network that provides customer devices access to content sourced by network destinations. The network device comprises at least one interface to receive network communications from the edge network device, wherein the network communications are originated by the customer devices and forwarded by the edge network device and a control unit. The control unit includes a condensation services layer configured to process the forwarded network communications from the edge network device and maintain a transaction log for each of the plurality of customer devices of the service provider network, wherein the transaction log for each of the customers includes entries listing electronic advertisements sourced by advertisement networks that are selected by a customer operating the respective customer devices, wherein the advertisements direct customer devices to one of the network destinations that resides in a domain when selected by a customer operating the one of the customer devices and a correlation layer that correlates those of the network communications from the customer devices committing to an action with any of the electronic advertisements previously presented to the customers.

In another embodiment, a method comprises receiving, with a network device configured to communicate with an edge network device located at an edge of a service provider network that provides customer devices access to content sourced by network destinations, network communications from the edge network device, wherein the network communications are originated by the customer devices and forwarded by the edge network device to the network device. The method further comprises processing, with the network device, the forwarded network communications from the edge network device and maintain a transaction log for each of the plurality of customer devices of the service provider network, wherein the transaction log for each of the customers includes entries listing electronic advertisements sourced by advertisement networks that are selected by a customer operating the respective customer devices, and wherein the advertisements direct customer devices to one of the network destinations that resides in a domain when selected by a customer operating the one of the customer devices and correlating, with the network device, those of the network communications from the customer devices committing to an action with any of the electronic advertisements previously presented to the customers.

In another embodiment, a computer-readable storage medium comprising instructions for causing a processor to receive, with a network device configured to communicate with an edge network device located at an edge of a service provider network that provides customer devices access to content sourced by network destinations, network communications from the edge network device, wherein the network communications are originated by the customer devices and forwarded by the edge network device to the network device. The instructions further cause the processor to process, with the network device, the forwarded network communications from the edge network device and maintain a transaction log for each of the plurality of customer devices of the service provider network, wherein the transaction log for each of the customers includes entries listing electronic advertisements sourced by advertisement networks that are selected by a customer operating the respective customer devices, and wherein the advertisements direct customer devices to one of the network destinations that resides in a domain when selected by a customer operating the one of the customer devices and correlate, with the network device, those of the network communications from the customer devices committing to an action with any of the electronic advertisements previously presented to the customers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
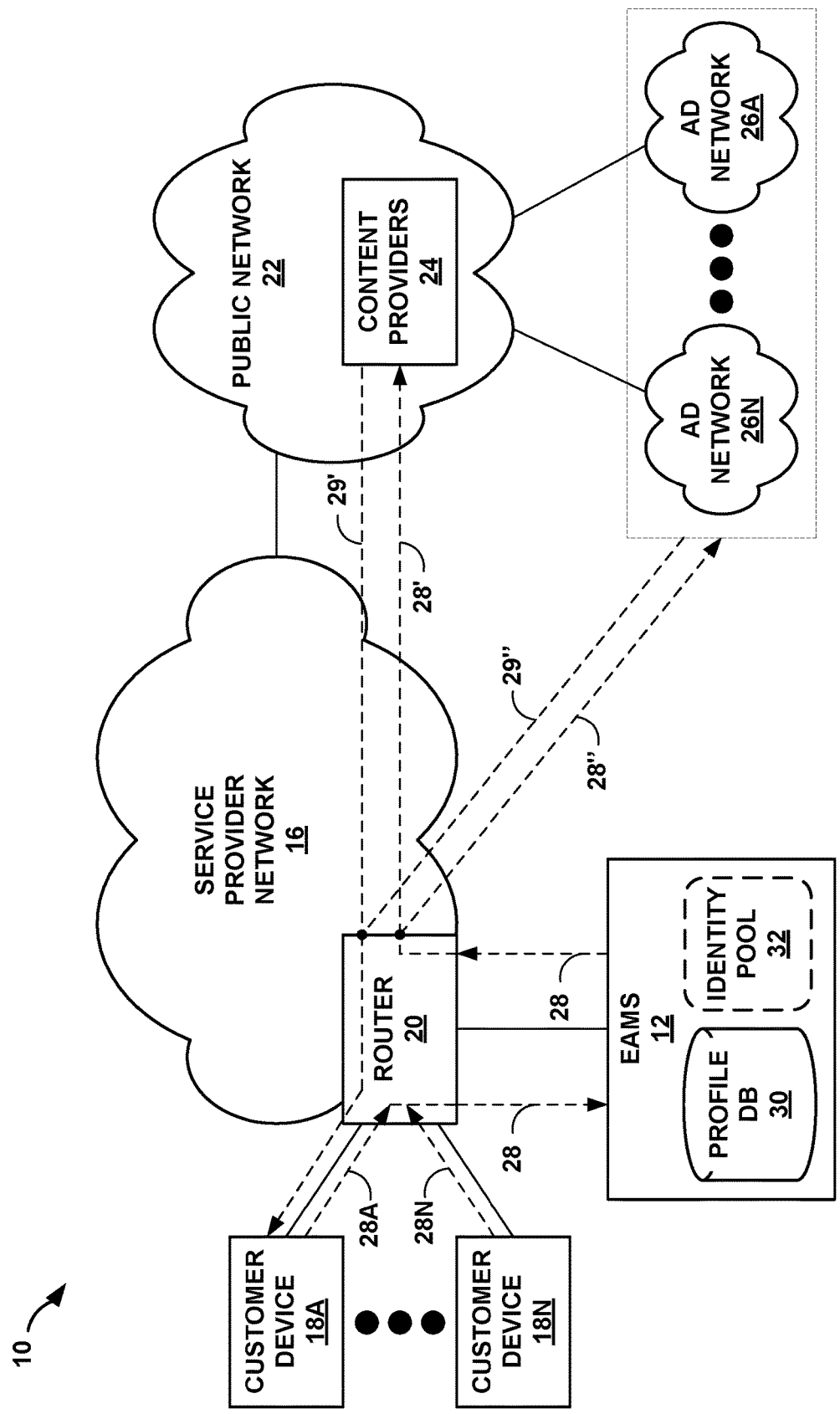
FIG. 1 is a block diagram illustrating an example network system in which a network device performs profiling and privacy aspects of the last mile online advertising techniques described in this disclosure.

FIG. 1 is a block diagram illustrating an example network system 10 in which a network device performs profiling and privacy aspects of the last mile online advertising techniques described in this disclosure. In particular, a network device shown in FIG. 1 as edge advertisement management system 12 ("EAMS 12") performs various aspects of the online advertising techniques described in this disclosure. While described with respect to a stand-alone or separate network device, EAMS 12 may be integrated within another network device, such as router 20, as an integrated service card, module or other component of router 20. The techniques therefore should not be limited to the example depicted in FIG. 1.

In the example of FIG. 1, network system 10 includes a service provider network 16 that provides one or more services to a plurality of customer devices 18A-18N ("customer devices 18"). The one or more services may include a digital television or TV service, a data or Internet service, a mobile service (e.g., cellular telephone voice, data and video services) and a digital telephony service (which may include Voice over Internet Protocol or VoIP service). These services may also be referred to as "channels" in that each service may comprise a different channel by which to provide content to consumers of this content, e.g., customers operating customer devices 18.

Often, the service provider offers two or more of these services packaged together at a reduced price. For example, one package, referred to as a "triple-play" package, provides television, data and telephone services at a discount price. These packages came about due to convergence of past disparate networks to a single network that may emulate one or more other networks. For example, the Internet and Plain Old Telephone Service (POTS) network converged with the Internet being adapted to provide telephone services in the form of the VoIP service. Similarly, the broadcast television network has begun to converge with the Internet, where the Internet is being adapted to provide video programming in the form of Internet Protocol Television (IPTV) and other video streams. A single network, rather than three different networks, that provides multiple services may significantly reduce costs associated with owning, operating and maintaining a network. These lower costs continue to drive the convergence of these networks into a single network.

As a result, a service provider may now maintain and operate a single service provider network, such as service provider network 16, capable of providing many different services or channels of data to customer devices 18. As a result, customer devices 18 may include any type of device capable of receiving and providing access to one or more of the services, such as a laptop computer, a desktop computer, a workstation, a mobile phone (including so-called "smart" phones), a Set-Top Box (STB) or other receiver, a VoIP enabled telephone, a Personal Digital Assistant (PDA), or any other device capable of receiving one or more of the above described services. In each service, a layer three or network layer device, such as a router 20, may route the data for each of these services to customer devices 18. Router 20 may therefore represent a device that implements a network layer protocol, such as IP. Likewise, service provider network 16 may be referred to generally as a layer three network and, more particularly, as an IP network. As IP networks transmit the data in the form of packets and router 20 actively switch or route these packets from a source device to a destination device, service provider network 16 may also be referred to as a packet-switched network.

As further shown in the example of FIG. 1, service provider network 16 may couple to public network 22, which represents a collection of one or more computer networks accessible by the public. Public network 22 may, like service provider network 16, comprise a layer three, packet-switched network. One example of a public network is the Internet. Public network 22 generally includes a plurality of computing and/or networking devices that are generally referred to as content providers 24. Content providers 24 may include one or more web servers, application servers, print servers, file servers, data servers, routers, switches, hubs, workstations, laptop computers, desktop computers, mobile phones (such as so-called "smart" phones), and any other device capable of accessing a network and serving content.

Public network 22 may also couple to a number of other networks, such as ad networks 26A-26N ("ad networks 26"). In effect, public network 22 may include ad networks 26, and ad networks 26 are shown separate from public network 22 in FIG. 1 to facilitate discussion of these ad networks 26. Ad networks 26 may represent a repository for advertisements and an interface by which to access those advertisements. Ad networks 26 typically contract with one or more content providers 24 to provide advertisements on behalf of advertisers to consumers of the content provided by content providers 24. For example, one of content providers 24 may operate a large online newspaper and may contract with one of ad networks 26 such that this one of ad networks 26 provides advertisements alongside articles and other content provided by this one of content providers 24.

Typically, the consumers of the content, which may also be referred to as customers of service provider network 16, operate customer devices 18 and direct customer devices 18 to access content provided by content providers 24. Customer devices 18 may access this content by issuing network communications that request content to content providers 24. With respect to data or Internet services, the network communications may comprise HyperText Transfer Protocol (HTTP) communications. With respect to VoIP services and, in some instances, IPTV services, the request may comprise a Session Initiation Protocol (SIP) communication and/or a Realtime Transfer Protocol (RTP) communication. Generally, network communications may refer to any form of communication via a network that requests content, including communications to establish a service, such as a VoIP call, and accessing content, such as a webpage. These network communications are shown in FIG. 1 as network communications 28A-28N ("network communications 28").

In response to these network communications 28, content providers 24 may access the requested content and provide the requested content to the requesting one of customer devices 18. The requested content may specify additional content or resources that customer devices 18 need to retrieve to properly render and then display the requested content. This additional content may comprise one or more of images, video streams, audio streams, and advertisements. As one example, content providers 24 may generate or retrieve a document written in a HyperText Markup Language (HTML), which is generally referred to as a "webpage," that is identified by a Uniform Resource Locator (URL). This webpage may include references to a number of additional resources, including electronic advertisements. Customer device 18A may, for example, request this webpage and, when rendering this webpage, retrieve the identified additional resources from other locations or destination, including one or more of ad networks 26. In this respect, content providers 24 may embed advertisements within webpages in a manner that causes these requesting one of customer devices 18 to dynamically retrieve and load advertisements hosted by ad networks 26.

In accordance with the techniques described in this disclosure, router 20 may receive one of network communications 28 from a respective one of customer devices 18. This one of network communications 28, e.g., network communication 28A, may be destined for a network destination, such as one of content providers 24, within public network 22. Router 20 may forward this network communication 28 to EAMS 12 rather than forward the network communications directly to the network destination, e.g., one of content providers 24. In this respect, router 20 may intercept network communications 28 and shunt network communications 28 or copies thereof to EAMS 12. In some instances, router 20 may intercept all of network communications 28, both requests and responses, and forward all or portions of these network communications 28 to EAMS 12. In this respect, EAMS 12 may receive and apply one or more of the techniques set forth in this disclosure to each and every communication originated from and destined for customer devices 18. Accordingly, EAMS 12 may track each and every one of communications 28, including communications 28 across multiple channels or services, with respect to each and every one of customer devices 18.

In some instances, EAMS 12 may be configured as a content proxy or otherwise provide content proxy services. In these instances, EAMS 12 may cache content from content providers 24 locally within EAMS 12 and serve this content to customer devices on behalf of content providers 24. For example, customer device 18A may request content from one of content providers 24 and EAMS 12 may determine whether the requested content is cached locally within EAMS 12. If locally cached, EAMS 12 may serve the content on behalf of the one of content providers 24 without forwarding the content request or other network communication to the intended destination of this communication (e.g., the one of content providers 24). EAMS 12 may therefore effectively act as a proxy content provider that terminates the session on behalf of the one of content providers 24.

If the requested content is not locally cached, EAMS 12 may establish a new session between EAMS 12 and the one of content providers 24 to download or otherwise retrieve the requested content. EAMS 12 may then serve the requested content to customer device 18A. Again, EAMS 12 may act as a proxy content provider and effectively terminate a first session between customer device 18A and EAMS 12 and terminate a second session between EAMS 12 and the one of content providers 24. To effectively terminate a session may refer to instances where EAMS 12 serves content on behalf of the intended destination, which in this case is one of content providers 24. To terminate a session may refer to instances where EAMS 12 requests content using its own address, e.g., IP address, and port number, e.g., IP port number.

Thus, rather than allow customer devices 18 to establish a session between customer devices 18 and content providers 24, EAMS 12 may segment the session into a first session and a second session, where, in the first session, EAMS 12 acts as a proxy for the content provider and uses the content providers address and port numbers to serve the requested content and, in the second session, EAMS 12 requests content on behalf of customer devices 18 using the address assigned to EAMS 12. EAMS 12 may act as a proxy in this manner for reasons described in more detail below. However, briefly, EAMS 12 may act as a content proxy to improve the speed with which content is served, as EAMS 12 lies closer to customer devices 18 than content providers 12, and obscure the identity of, e.g., addresses assigned to, customer devices 18 so as to provide a higher level of privacy to customer devices 18.

Whether acting as a proxy or not, EAMS 12 receives network communications 28 and analyzes these communications 28 to construct a profile detailing one or more demographics, interests, actions and/or behavior of those customers operating one or more of customer devices 18. EAMS 12 may analyze various aspects of network communications 28, including one or more headers of network communications 28 and payload data.

In this example of FIG. 1, EAMS 12 includes a policy database 30 ("privacy database 30") in which to store data defining these policies. EAMS 12 may also include a history database (not shown in FIG. 1) in which to store data defining history logs that track network communications 28 from each of customer devices 18, respectively. This data or information may be organized in the history log by customer and time in a manner that reflects a transaction log for each of the customers of the service provider network. In other words, this history log may represent a transaction log that specifies temporal data for each of the requests. EAMS 12 may analyze the history logs to determine a profile for each of costumer devices 18 and possibly each of one or more customers who operate customer devices 18. EAMS 12 may then store data defining these profiles and thereafter update this data to reflect changing interests, actions and/or behavior.

Notably, this history log may track communications 28 that span multiple services or channels, including IPTV service, mobile services, VoIP services and data or Internet services. As a result of this data spanning multiple channels, the history log may provide a more comprehensive data source by which to track customer behavior, interests and actions across multiple services over most if not all other forms of data collection, which are typically limited to particular domains in a data network and typically cannot span even a single network. Moreover, because the profile is extracted from this history log, the profile may too represent a composite view of a consumer's behavior, interests and actions that spans multiple channels or services. The profile may therefore be referred to as a "composite" profile for this reason.

In any event, EAMS 12 may update this profile data in response to each one of network communications 28 or may periodically update this profile data at set intervals. As an alternative, EAMS 12 may update this data in response to particular events, such as selecting an advertisement, selecting to purchase an item, sign up for an email publication or perform a variety of other actions. Regardless of how the profile data is updated, EAMS 12 may generate a profile that more accurately describes the customer interests, actions and/or behavior from this history data. This profile may form the basis of a standardized application layer cookie that complies with a standard set forth by a standards body, a proprietary standard or an open standard.

When analyzing these network communications 28, EAMS 12 may also determine whether or not network communications 28 include any "first mile" cookies. A first mile cookie refers to cookies set by content providers 24 and/or ad networks 26, where "first mile" refers to the typical location of content provider with respect to a session by which content is provided to consumers of the content, e.g., customers operating customer devices 18. A "first mile" of a connection or session may therefore be characterized as the portion of a connection or session between content provider 24 within public network 16 and a service provider network, such as service provider network 16. As these cookies relate to applications, such as HTTP webpages, these cookies may also be referred to as application layer cookies.

Commonly, content providers 24 and/or ad networks 26 insert these "first mile" cookies onto customer devices 18 by specifying a set-cookie portion of an HTTP header in HTTP responses delivered to the customer devices. For this reason, these cookies may also be referred to as "destination-set" cookies as a network destination that resides at the first mile may set these cookies. The set-cookie portion indicates a domain that controls when the one of customer devices 18, e.g., customer device 18A, should return the respective cookie, an expiration time at which the cookie expires, and other aspects of a cookie, such as information to log or otherwise store. Customers may enable or disable cookies or may otherwise limit how content providers 24 and/or ad networks 26 set cookies within customer devices 18, e.g., by limiting cookies to those of content provider 24 and/or ad networks 26 that the consumer trusts. However, often consumers are not aware of cookies let alone such features for disabling them or limiting these first mile cookies within customer devices 18.

As a result, one or more of customer devices 18 may be configured to store all cookies specified by content providers 24 and/or ad networks 26 in this set-cookie portion of the HTTP header of an HTTP response. Content providers 24 and ad networks 26 may utilize the cookies as structures for logging information concerning a wide variety of subjects, such as web browsing history or webpages visited over time, items in a virtual shopping cart, addresses, emails, search terms, demographic data previously entered by the customer, security questions and answers and even financial information, usernames and passwords. Consumers may, however, be completely unaware of this aspect of cookies and the sensitive and usually private information stored by these first mile cookies.

EAMS 12 may remove these cookies from the network communications 28 to preserve the privacy of the consumers with respect to this potentially private and sensitive information. EAMS 12 may then generate a pseudonym for the customer device 18 from which network communication 28A was originated. EAMS 12 generates this pseudonym by, in one example, performing a one-way hash on a Media Access Control (MAC) address assigned to one of customer devices 18, e.g., customer device 18A, from which this network communication 28A was originated. The seed for this one-way hash may comprise a time of day or other determinable but changing value. This one-way hash may obscure the identity of customer device 18A and thereby mask or otherwise scramble the identity of customer device 18A for which the above profile was determined. This scrambling may make the information in the profile, in effect, anonymous in that the profile information cannot be used to identity customer device 18A that originated network communication 28A.

To provide context, a cookie may commonly include or define an address assigned to customer device 18A. Often, this address may be statically assigned to customer device 18A, such as a MAC address. Ad networks 26 may then use this address as a fixed reference point by which to compile information concerning customers using customer device 18A. Some of this information may be Personally Identifiable Information (PII), such as telephone numbers, mailing addresses, email addresses, names and possibly even social security numbers, driver license numbers, credit card numbers, passwords, and usernames. Ad networks 26 may possibly also use this information to gather additional information or, in some instances, make portions of this information available for a price to other ad networks (e.g., telemarketer, spam or other more invasive ad networks). EAMS 12 may prevent ad networks 26 of learning this address by performing a one-way hash on this address using a variable seed, such that the same customer device may receive and operate under a continually changing series of pseudonyms.

To illustrate, customer device 18A may generate and forward a first network communication 28A' (not shown explicitly in FIG. 1), which router 20 intercepts and forwards to EAMS 12. This first network communication 28A' may request content from a first one of content providers 24 and include information that identifies customer device 18A. EAMS 12 may strip or otherwise remove this information and update profile data stored within profile database 22 for customer device 18A. EAMS 12 may then perform a one-way hash using the current time as a seed on the MAC address assigned to customer device 18A and included within network communication 28A', thereby assigning a first pseudonym to customer device 18A that replaces the actual identity assigned to customer device 18A. EAMS 12 may forward this communication 28A' to a destination device, e.g., one of content providers 24.

EAMS 12 may then receive another network communication 28A" (not shown explicitly in FIG. 1) from customer device 18A via router 20. EAMS 12 may also perform a one-way hash using the current time, which is different from the current time above, to generate a second pseudonym. EAMS 12 may again replace the actual identity assigned to customer device 18A with this second pseudonym that is different from the first pseudonym and forward this communication 28A" to the same one of content providers 24. In this sense, EAMS 12 may maintain an identity pool 32 that includes a plurality of pseudonyms that can be assigned to customer devices 18 to preserve the actual identity assigned to customer devices 18. As different pseudonyms may be assigned for each request, EAMS 12 may prevent content providers 24 from accurately tracking a particular one of customer devices 18 based on the address included within cookies.

Yet, the network communication in which the cookie is included may provide one or more of the addresses included within the cookie. Ad networks 26 may, to overcome this scrambled address in the cookie, begin harvesting information from the network communication and compiling the information in a manner similar to that described above. To prevent this, EAMS 12 may provide the proxy functionality described above to obscure any of the addresses of customer devices 18, including the static or fixed addresses, by terminating the session at EAMS 12 rather than allowing the session to terminate at customer devices 18. Consequently, in combination with the proxy functionality, EAMS 12 may effectively block any attempt by ad networks 26 to compile information on customer devices 18. As a result, EAMS 12 may provide an increased level of privacy to consumer devices 18.

EAMS 12 may, after scrambling or otherwise masking the identity assigned to customer device 18A, then insert the above referenced application layer cookie into the network communication, where this cookie specifies the profile and the pseudonym. Effectively, EAMS 12 replaces the "first mile" cookie with what may be referred to as a "last mile" cookie to provide more accurate information concerning a given customer's behavior while simultaneously addressing privacy concerns associated with cookies in general. This last mile cookie may also be referred to as an anonymous cookie in that the pseudonym effectively makes this last mile cookie anonymous. In some instances, EAMS 12 may encrypt this last mile cookie and only allow those of ad networks 26 and other domains that subscribe to a last mile advertisement service offered by EAMS 12 to decrypt the last mile cookie. In other words, ad networks 26 may subscribe to a last mile advertisement service offered by EAMS 12 to receive a key by which to decrypt the last mile cookie. This encryption may further protect customers from any unwanted privacy invasions by reducing, if not preventing, data collection through cookies by ad networks 26. EAMS 12 may be configurable to enable or disable this encryption on a per customer as well as per website, domain or other basis to accommodate a wide range of tolerance toward privacy concerns by customers. These setting may be defined within profile data stored to profile database 30.

Upon inserting the application-layer or last mile cookie into network communications 28A, EAMS 12 then forwards these network communications 28 to either one of content providers 24 and/or ad networks 26. For this reason, network communications 28 are shown as going both to content providers 24 and ad networks 26 from router 20, where those of network communications 28 directed to content providers 24 are shown in FIG. 1 as network communications 28' and those of network communications 28 directed to ad networks 26 are shown in FIG. 1 as network communications 28". Considering again the example described above with respect to rendering webpages, often customer device 18A inserts cookies when accessing the additional network resources, such as advertisements hosted by ad networks 26, via network communications 28". Below the techniques are described below for ease of illustration purposes with respect to network communications 28" although the same techniques may be implemented with respect to network communications 28'.

Typically, ad networks 26 set cookies to appropriately target the consumer within a given group and select an advertisement based on the targeted group. Targeting may involve collecting information concerning a consumer's habits, interests, actions, disinterests, behavior, age, sex, or any other characteristic or metric by which to evaluate a potential subset or group of the population to which the consumer may belong. Then based on the determined targeted group, ad networks 26 may select an advertisement that has been shown in the past to be effective with respect to this group, e.g., an advertisement that might lead to a potential action by a viewer of the advertisement with respect to the good, item or service offered by the advertisement.

With respect to the techniques of this disclosure, ad networks 26 may receive an encrypted version of the last mile cookie. However, ad networks 26 may not be able to decrypt this last mile cookie unless the ad network subscribes to a subscription service offered by EAMS 12. This subscription may come in a variety of levels, from a basic or bronze level to an upgrade or silver level and possibly to a premium or gold level. The varying plurality of subscription levels may each be associated with a particular level of granularity such that, for example, a bronze level subscriber may receive profile data having a county or state wide level of granularity where the profile describes an interests, action and/or behavior in the larger geographical scope of the state or county. The silver level subscriber may receive a profile data having a zip code or possibly street wide level of granularity. The gold level subscriber may receive profile data having to a city block or possibly an individual level of granularity. The varying levels may also differentiate between time horizons, where the bronze level provides data generalized over the last month, the silver level provides profile data generalized over the last month and the last two weeks, and the gold level provides profile data generalized over the last year, the last month, the last two weeks and the last day.

In any event, assuming a given one of ad networks 26 subscribes to one of these levels, EAMS 12 includes profile data within the application layer cookie segmented according to the subscribed level of both granularity and time horizon, which ad networks 26 uses to target customer device 18A. Notably, the profile data, regardless of the level of subscription, is more complete than first mile profile data collected by content providers 24 and networks 26 and may improve substantially the level of targeting achieved by ad networks 26 when compared to most first mile profiling data. Thus, the techniques may generally improve the level of targeting capable by ad networks 26, which in turn may increase the ad revenues under most revenue models (which may also be referred to as revenue models), including the Click Per thousand impressions (CPM), Cost Per Click (CPC) and Cost Per Action (CPA) revenue models, which are described below in more detail. This improved ability to target may more than make up for the increased costs of the subscription required to access this improved profile data.

Ad networks 26 may therefore decrypt the last mile cookie extracted from network communications 28". Ad networks 26 may then recover the profile data from each of these cookies to more accurately target the advertisement to the customer operating customer device 18A. After selecting an advertisement, ad networks returns this advertisement to customer device 18A as response network communications 29", causing the customer device to render the advertisement alongside the content requested from content providers 24 and returned via response network communications 29'. Router 20 may forward responses 29' and 29" ("network communications 29") directly to the appropriate one of customer devices 18, which in this instance may comprise customer device 18A, or may once again intercept these communications 29 and forward these communications through EAMS 12 before forwarding communications 29 to customer devices 18.

Router 20 may intercept and forward these responses 29 to EAMS 12 for further analysis in that EAMS 12 may further update the above describe history database with these responses 29. EAMS 12 may use this additional historical data or transactional data of a temporal nature to provide further services and/or data to a variety of other online advertising participants, as described below in more detail. Alternatively, in the instance where EAMS 12 acts as a proxy, router 20 may route communications 29 to EAMS 12 because EAMS 12 terminates each and every session on behalf of customer devices 18 that is external to service provider network 22 so as to preserve the identity and therefore privacy of customer devices 18.

Figure 2:
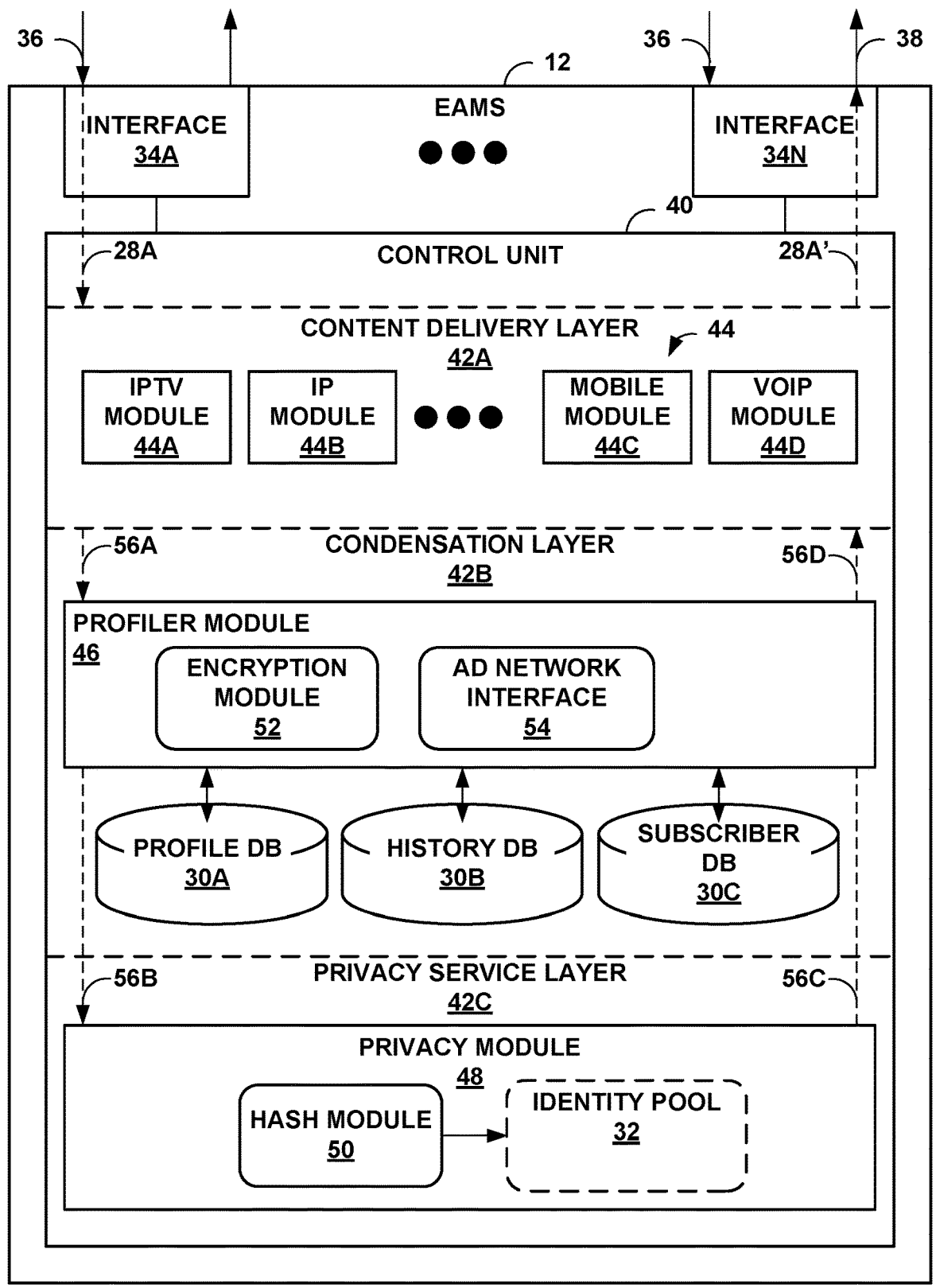
FIG. 2 is a block diagram illustrating an example embodiment of edge advertisement management system in implementing various aspects of the last mile online advertising techniques described in this disclosure.

FIG. 2 is a block diagram illustrating an example embodiment of EAMS 12 of FIG. 1 in implementing various aspects of the last mile online advertising techniques described in this disclosure. In the example of FIG. 2, EAMS 12 includes interfaces 34A-34N ("interfaces 34"), each of which receives and sends network communications, such as network communications 28 shown in FIG. 1, via inbound connections 36 and outbound connections 38, respectively. Interfaces 34 may represent network interface cards that couple to inbound network links and outbound network links or other interfaces to other communication mediums.

Each of interfaces 34 is coupled to control unit 40 and may forward and receive network communications 28 to control unit 40. Control unit 40 may comprise any combination of hardware and software that implement the techniques described in this disclosure. Control unit 40 may comprise one or more processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor executes to perform the functionality described herein, including the functionality attributed to the techniques of this disclosure.

Control unit 40 may be logically separated into layers 42A-42C. Layer 42A is referred to as content delivery layer 42A and components in this layer manage the delivery of and receipt of content across a plurality of services or channels. Content delivery layer 42A includes channels modules 44, where example channel modules 44 comprise an IPTV module 44A, an IP module 44B, a mobile module 44C and a VoIP module 44D. IPTV module 44A represents a hardware and/or software module that manages the delivery and receipt of IPTV content. IP module 44B represents a hardware and/or software module that manages the delivery and receipt of IP or data content. Mobile module 44C represents a hardware and/or software module that manages the delivery and receipt of mobile content, including mobile telephone or voice content, data content (such as text messages and Internet content) and video content. VoIP module 44D represents a hardware and/or software module that manages the delivery and receipt of VoIP content. Each of these modules may output IP packets or other discreet data units that include at least one header and a payload defining application content, e.g., a video stream, a webpage, a mobile text message, a VoIP stream.

Layer 42B is referred to as condensation layer 42B as components in this layer condense data received from channel modules 44. Condensation layer 42B includes a profiler module 46 that maintains databases 30A-30C. For example, profile module 46 may store data defining the above described transaction log or history for each of customer devices 18 within history database 30B ("history DB 30B"). Profiler module 46 may also store data defining a subscription, including the level of subscription and current encryption/decryption keys for each subscribing one of ad networks 26 within subscriber database 30C ("subscriber DB 30C").

Profiler module 46 may then condense the data defining each of the history or transaction logs stored in history database 30B to generate a comprehensive profile that corresponds to a highest (best or most expensive) subscription level. Profiler module 46 may maintain this comprehensive profile to facilitate delivery of the profile to these high-level subscribers in near real-time. Moreover, by maintaining the comprehensive profile, profiler module 46 may quickly reduce the granularity of these comprehensive profiles to generate a reduced profile that corresponds to lower subscription levels. Profiler module 46 may store this data as profile data within profile database 30A ("profile DB 30A"), where profile data defines a profile for each one of customer devices 18. Profiler module 46 also includes encryption module 52 that may encrypt network communications.

Layer 42C is referred to as a privacy service layer 42C and components in this layer may provide privacy services to mask or otherwise scramble an actual user identity. Privacy service layer 42C includes a privacy module 48 that, in one embodiment, maintains identity pool 32. In one example, privacy module 48 includes a hash module 50 that defines identity pool 32 as a set of hash values based on criteria specific to each of the customer and his or her customer device 18, such as MAC address, subnet, VLAN, zip code, user name and the like. Hash module 50 may perform the above described one-way hash function by which pseudonyms are generated.

In general, one or more ad networks 26 subscribe to various levels of access to profile database 30A. In one example, profiler module 46 may provide an ad network interface 54, which may represent an ad network Application Programmers Interface (API), by which these ad networks 26 may request and receive online advertising services provided by EAMS 12. Subscriber management logic within profiler module 46 updates subscriber database 30C to reflect the subscription by these subscribers by adding a new subscriber record to subscriber database 30C for each subscribing one of ad network 26.

EAMS 12 receives an analyzes network communications shunted from service provider network 16. More particularly, one of interfaces 34, such as interface 34A, may receives network communications originating from one of customer devices 18, such as a network communication 28A from customer device 18A, via inbound connection 36. Interface 34A forwards network communication 28A to channel modules 44 of control unit 40, where the appropriate one of modules 44A-44D receives network communications 28A in accordance with one or more protocols. Assuming for purposes of illustration that network communication 28A comprises an IP packet that defines an HTTP GET request requesting content from one of content providers 24, IP module 44B may process this data packet and forward communication 28A to profiler module 46 within condensation layer 42B for parsing and data extraction. Often, HTTP GET requests include one or more application layer cookies, which are referred to herein as first mile cookies for the reasons described above.

First mile cookies may comprise one of two general types of cookies, first-party cookies and third-party cookies. First party cookies may represent cookies that are associated or set by a host domain, e.g., domains operated by one of content publishers 24. Third-party cookies may represent cookies from or set by any domain other than the host domain, such as ad networks 26. To illustrate, consider a customer that directs customer device 18A to request content from a domain identified by the Uniform Resource Locator (URL) www.example1.com and hosted by one of content providers 24. This customer may interface with a web browser application executing on customer device 18A and entering the URL "www.example1.com" in an address bar of the web browser. If ad networks 26 have contracted with this one of content providers 24 such that this one of content providers 24 agrees to publish banner advertisements from ad network domains identified by URLs sample.example1.com, www.example2.com and www.example1.net and all these advertisements each set a respective cookie as well as the host domain, the cookies from www.example1.com and sample.example1.com are in the first-party context, while the cookies from www.example2.com and www.example1.net are in the third-party context.

Typically, third-party cookies represent cookies that are most likely to present privacy concerns, as these cookies may be set to actively log customer activity as the customer browses or otherwise traverses the web. First-party cookies may enable virtual shopping carts, persistent storage of preferences, and other benefits that enhance or otherwise provide a fuller experience with respect to the host domain. Third-party cookies may track customers across websites so long as the website includes a banner or other advertisement provided by a particular one of ad networks 26. That is, ad networks 26 may only set cookies such that customer devices 26 return the cookies for this one of ad networks 26 upon encountering another advertisement associated with this same one of ad networks 26.

For example, ad networks 26A may typically host their own advertisements and require customer device 18A to access ad network 26A in order to render than then present a webpage. The webpage may provide an URL that customer device 18A accesses in order to retrieve the advertisements and moreover this one of ad networks 18A may specify that customer device 18A is to set a cookie that customer device 18A is to return upon encountering the domain of ad network 26A in this and any other websites. Customer device 18A may then set this cookie and upon encountering any other URLs associated with the domain of ad network 26A, customer device 18A may return the cookie set by ad network 26A. In this manner, ad networks 26 may set persistent third-party cookies and use these cookies to track customer devices 18 as customer devices 18 visits different websites.

This form of customer tracking may however, as described above, occur transparently to customers as customers seldom disable either first- or third-party cookies or, in fact, even know that cookies can be limited in this manner. Thus, customers may casually browse public network 22, e.g., the Internet, with a web browser and unknown to the customer, the web browser may update and forward countless cookies filled with private information to one or more ad networks 26 and/or content providers 24. As described above, ad networks 26 may use this information to positively identify a particular customer for purposes of targeting this customer and serving ads to maximize ad revenue. Also as described above, ad networks 26 may, however, also sell this information to other ad agencies for other forms of advertising, which may further constitute privacy concerns especially if a customer has been positively identified by email address, mailing address, or phone number, as the amount of spam email, unsolicited mail advertisements and telemarketer calls may increase substantially once this information is sold to another party.

To increase privacy with respect to customers using customer device 18A, profiler module 46 may therefore remove first-party, third-party, or both first- and third-party cookies from communication 56A received from IP module 44B. Profiler module 46 may also analyze communication 56A to collect application-layer information about customer device 18A and store this information to history database 30B. Profiler module 46 may then access subscriber database 30C to determine whether a subscriber is associated with any of these cookies. If no subscriber is associated with any of the domains and/or URLs of these cookies, profiler module 46 may remove the cookie and forward network communication 56A on as profiled network communication 56B.

However, if a subscriber is associated with one of the domains and/or URLs of these first-mile cookies, profiler module 46 may construct or otherwise update a comprehensive profile within profile database 30A in response to detecting this association. This comprehensive profile may, as described above, comprise a granular distillation of the history log stored to history database 30B that corresponds to the highest (best, or most expensive) subscription level. As an alternative or in conjunction with the above techniques, profiler module 46 may store multiple profiles for each customer, one for each level of subscription. Profiler module 46 may store this data defining these comprehensive profiles in profile database 30A. Consequently, profile database 30A may store data defining a single comprehensive profile for each one of customer devices 18. Profile data may define a plurality of marketing categories and preference data defining an interest or interest levels in each marketing category and, in some instances, demographic information as well. Note that interest levels may be used interchangeably in this disclosure with preference data.

Example marketing categories include sports, shopping, hobbies, travel, leisure, entertainment, dining, and any other typical or atypical marketing category. Marketing categories may also include sub-categories such as particular types of sports (e.g., football, soccer, baseball, and tennis), particular types of shopping (e.g., groceries, clothing, shoes, and home improvement), particular types of hobbies (e.g., stamp collecting, sport memorabilia, and golf), etc. Example demographic information may include a sex or gender of a customer, a preferred time of day during which the customer tends to shop online, a geographic location f the customer, an average monetary spend value for online services and goods for the customer, a number of family members in a household of the customer, and an estimated age for the customer.

For these comprehensive profiles, the profile data may define a plurality of marketing categories, sub-categories and niches within sub-categories and the preference data may define an interest within each of these various subdivisions. When providing a profile for lower subscription levels, profiler module 46 may reduce the level of granularity of the comprehensive profiles stored to profile database 30A, e.g., by applying filters or combining one or more profiles (such as in the case of reducing the geographic granularity), and return this reduced profile in place of the comprehensive profile. Profile module 46 may maintain the comprehensive profiles in profile database 30A to facilitate updates to the profiles and speed delivery of information to the highest subscription level subscribers. In this manner, profiler module 46 may generate profiles according to the subscription levels of a particular subscriber to either narrow or expand the extent of the profile data, much as described above.

Profiler module 46 may then insert one or more cookies into communication 56A, each of which specify the profiles associated with the one or more identified subscribers and forward this communication as modified network communication 56B to privacy module 48. Privacy module 48 may receive modified network communication 56B and perform privacy services to obscure or otherwise mask an actual customer identity assigned to customer device 18A. As described above, hash module 50 of privacy module 48 may effectively maintain identity pool 32 and may perform a one-way hash on a MAC address assigned to customer device 18A to thereby select a pseudonym for customer device 18A. Hash module 50 may employ a hash function that uses a variable seed, such as a current time in the day, to randomly select this pseudonym. This masking disassociates the profile from a particular one of customer devices 18 and effectively makes the profile anonymous. Privacy module 46 may then forward this communication as privacy-protected communication 56C to profiler module 46, where encryption module 52 of profiler module 46 may encrypt the cookie defining the profile data using encryption keys stored for an associated one of the subscribers in subscriber database 30C. Profiler module 46 may forward this communication as secure network communication 56D to channel modules 44.

One of channel modules 44, e.g., IP module 44B, receives the secure network communication 56D and prepares the communication 56D for transmission over the desired channel. Continuing the assumption above that network communication 28A comprised an IP packet, IP module 44B may add necessary IP headers and perform other operations to ensure delivery to a desired destination. IP module 44B may then forward this communication with the application-layer cookie defining the anonymous profile as network communication 28A', where one of interfaces 34, such as interface 34N in the instance of FIG. 1, may forward this communication to an intended destination device, e.g., ad network 26A.

In this manner, EAMS 12 may securely profile a customer without invading the customer's privacy while also ensuring that other third party network participants, e.g., ad networks 26, cannot identify the customer or otherwise compromise the customer's privacy. Yet, simultaneous to preserving customers' privacy, EAMS 12 may provide improved advertising services, such as more accurately profiling customers and providing improved anonymous targeting marketing of customers. This may improve an ad network's ability to accurately target and then serve an advertisement to these customers, thereby increasing the effectiveness of the advertising and reducing the amount of irrelevant information the customer views. In this sense, EAMS 12 may act as a trusted third-party that provides this service to both facilitate better advertisement services through more comprehensive or complete profiling and ensure customer's privacy is maintained. Moreover, as explained in further detail below, advertising agencies or other clients placing ads may utilize EAMS 12 to aid evaluation of and selection between the numerous ad networks 26 as well the various fee structures offered by the different ad networks.

Figure 3:
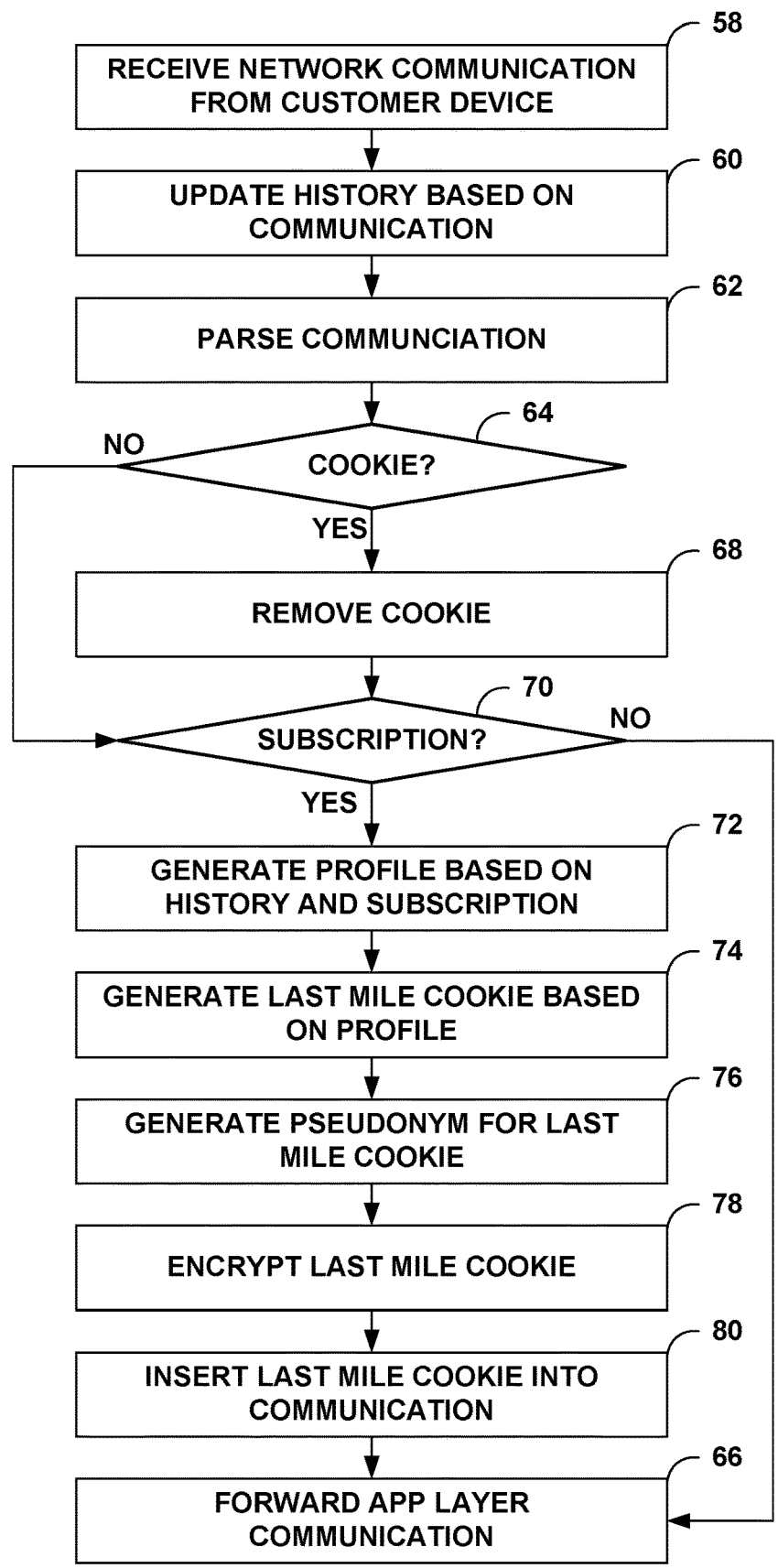
FIG. 3 is a flow chart illustrating an example operation of a network device in implementing various profiling and privacy aspects of the last mile online advertising techniques described in this disclosure.

FIG. 3 is a flow chart illustrating an example operation of a network device, such as EAMS 12 of FIG. 2, in implementing various profiling and privacy aspects of the last mile online advertising techniques described in this disclosure. Initially, EAMS 12 and, more particularly, profiler module 46 may receive subscription requests in accordance with an ad network interface 54 in the manner described above and update subscription database 30C to reflect this new subscription. Alternatively, a user or other network administrator may manually update subscription database 30C to reflect a new subscription. Further, customers of service provider network 16 may also opt into the privacy services offered by EAMS 12.

Regardless, once deployed, EAMS 12 receives shunted network communications 28 or copies thereof from service provider network 16. For example, one of interfaces 34 may receive a network communication originating from a customer device, such as network communication 28A originating from customer device 18A (58). As described above, this one of interfaces 34 may forward the communication to control unit 40, where one of channel modules 44 of control unit 40 may process network communication 28A and forward this processed communication to profiler module 46 as processed communication 56A. Profiler module 46 may update a history or transaction log associated with customer device 18A that originated communication 28A in history database 30B (60).

An example portion of a history log is shown below in Table 1:

TABLE 1

| Date:Time | URL | Keywords |
| --- | --- | --- |
| 5.12.2009:12:44:35 | www.dealer.com/locate_dealer?text=zipcode:94089 | car dealer, locate, zip code |
| 5.11.2009:14:43:15 | www.auto.com/cars/sedan | cars, sedan |
| 5.11.2009:14:19:54 | www.auto.com/cars/sedan/forsale?text=category:used-cars-sedan+price:15000-25000 | cars, sedan, prices, ratings |
| 5.10.2009:13:59:17 | www.review.com/auto/sedan | reviews, automotive, cars, sedan |

In the above Table 1, the history log includes a number of entries that are listed as rows with three exemplary columns, where each entry tracks actions by a customer in directing customer device 18A, for example, in browsing public network 22. The first entry indicates that customer device 18A output a network communication that specified a URL of "www.dealer.com/locate dealer?text=zipcode:99999" in association with keywords "car dealer," "locate" and "zip code" on May 12, 2009 at 12:44:35. The next entry indicates that this same customer device 18A accessed an URL of "www.auto.com/cars/sedan" in association with keywords "cars," "sedan," "prices," and "ratings" on May 11, 2009 at 14:43:15. The third entry indicates that this same customer device 18A accessed an URL of "www.auto.com/cars/sedan/forsale?text=category:used-cars-sedan+price:15000-25000" in association with keywords "cars," "sedans," "prices," and "ratings" on May 11, 2009 at 14:19:54. The fourth entry indicates that this same customer device 18A accessed an URL of "www.review.com/auto/sedan" in association with keywords "reviews," "automotive," "cars," and "sedan" on May 10, 2009 at 13:59:17. This history log may therefore track a customer temporally or over time.

Table 1 illustrates a simple example of a history log for purposes of illustration and the techniques should not be limited to this example. For example, the ULR may be much more descriptive and provide additional search terms other than just price and zip code as shown in the example above. Moreover, the history log may track first-mile cookies included within network communications sent by customer device 18A as well as actions with respect to particular advertisements or other links embedded within a given URL. That is, a history log may comprise entries that include one or more of a timestamp specifying a date and time the one of the advertisements was presented to the customer, a type of revenue model associated with the one of the advertisements, the advertisement network that sourced the one of the advertisements, the one of the network destinations accessed by the customer, and the first action linked to the one of the advertisements. Profiler module 46 may therefore store any characteristic or data point associated with a given network communication to a corresponding history log, including each network communication in its entirety. Typically profile module 46 parses communication 56A to extract and log data relevant to ad networks 26 and updates to history log (62).

While parsing communication 56A, profiler module 46 may determine whether this communication 56A includes a first mile cookie (64). If communication 56A does not include a cookie ("NO" 64), profiler module 46 may next determine whether a domain or URL specified in the communication 56A corresponds to a subscription with EAMS 12 (70). If communication 56A, however, does include a cookie ("YES" 64), profiler module 64 may remove this first mile cookie (68) and determine whether the domain or URL specified in communication 65A to which this cookie corresponds has a subscription with EAMS 12 (70). That is, profiler module 64 may access subscriber database 30C using the URL, as one example, as a key to locate a subscriber record stored within subscriber database 30C.

When no ad network 26 or network content provider 24 corresponds to the domain, i.e., no subscriber record is associated with the URL ("NO" 70), profiler module 46 may forward the communication back to channel modules 44, which may prepare communication 56A for forwarding over the corresponding channel and forward this communication to a corresponding one of interfaces 34 as communication 28A'. This one of interfaces 34 may then forward communication 28A' to its intended destination device, e.g., one of content providers 24 (66). If however, a subscriber record is located within subscriber database 30C that corresponds to the URL ("YES" 70), profiler module 46 may generate a profile based on the history log and the subscription level defined within the located subscriber record (72). In effect, profiler module 46 may mine the history log associated with customer device 18 and construct a profile for the subscriber that provides the level of granularity consistent with the subscription.

The following Table 2 represents an example of a subscriber record that profiler module 46 may access in order to determine a subscription level for a particular subscriber:

TABLE 2

| Domain | Subscription Level | Expiration | Encryption Keys |
|---|---|---|---|
| adnet1.com | bronze | Jul. 1, 2010 | key_set_1 |

In the above Table 2, an exemplary subscription record for one of ad networks 26 is shown, where this one of ad networks 26 comprises a domain name of "adnet1.com." This one of ad networks 26 has subscribed to profile data at a "bronze" subscription level terminating on Jul. 1, 2010 and uses encryption key set entitled "key_set_1."

The following Table 3A represents an example of a profile generated for customer device 18A based on mining the example history log shown in Table 1 above for a subscriber, e.g., ad network 26A, having a subscription level of bronze:

TABLE 3A

| Categories | Interest |
|---|---|
| Shopping | 2 |
| Hobbies | 2 |
| Travel | 0 |
| . . . | . . . |

In the above Table 3A, the profile provides a broad view of a customer operating customer device 18A in that no subcategories for each of the larger categories are defined. Table 3A defines two categories, "Shopping" and "Hobbies," which reflect that consumer device 18A has visited two websites related to shopping (e.g., entries 1 and 3 in Table 1 related to locating a dealer and searching for used cars for sale at a set price range) and hobbies (e.g., entries 2 and 4 related to a site about sedans and reviews of sedans, which may reflect an automotive-related hobby). Table 3A also defines another category, "Travel," and suggests that the particular customer has not directed customer device 18A to visit or otherwise browse any websites related to travel by keyword.

This profile represented above in Table 3A may also include demographic information which was also mined from the example history log shown in Table 1. The following Table 3B represents the demographic portion of the same profile:

TABLE 3B

| Gender | N/A |
|---|---|
| Preferred time of day to shop online | 1 |
| Geographic location | California |
| Price point for upcoming purchase | 15000-25000 |
| Number of Family Members in Household | N/A |
| Estimated Age of Customer | N/A |

The left-side of Table 3B defines a number of demographic metrics and the right-side of Table 3B provides corresponding values for each of these metrics. Again, this aspect of the profile may be generated based on the bronze subscription level. As a result, the "preferred time of day to shop online" metric is generally designated as 1 PM which is the closest hour between the two data points of 12:44 and 14:19. The "geographic location" metric is shown as California even though profiler module 46 may identify a zip code of 94089. In this manner, profiler module 46 may construct a profile that defines both marketing categories with interest expressed as a number of hits and demographic information that suits a given level of subscription.

Table 4A is provided to further illustrate generation of a profile in accordance with another level of subscription, which may be referred to as the "silver" level, based on the example history log shown in Table 1:

TABLE 4A

| Categories: Sub-Categories | Interest |
|---|---|
| Shopping: Automotive | 2 |
| Hobbies: Automotive | 2 |
| Travel | 0 |
| ... | ... |

In the example profile defined by Table 4A, the profile lists both categories and sub-categories thereby providing a further level of granularity with respect to customer's interests. In yet a higher or more granular level of subscription, e.g., the gold level, these sub-categories may, in some instances, be further subdivided into niches. To illustrate, the first entry of Table 4A may read as "Shopping:Automotive: Sedan" with respect to a profile generated for a gold level subscriber.

Table 4B, which illustrates the demographic portion of the profile shown with respect to Table 4A above, is also provided to further illustrate generation of a profile in accordance with the silver level based on the example history log shown in Table 1:

TABLE 4B

| Gender | N/A |
|---|---|
| Preferred time of day to shop online | 13:32 |
| Geographic location | Sunnyvale, California |
| Price point for upcoming purchase | 15000-25000 |
| Number of Family Members in Household | N/A |
| Estimated Age of Customer | N/A |

Table 4B has also been refined to provide higher granularity or more precise level of information. With respect to the metric related to a "preferred time of day to shop online" an average between the two known times of 14:19 and 12:44 is provided as 13:32 rather than as 1, as shown in Table 3B. As another example, the metric identifying "geographic location" is specified as a particular city, Sunnyvale, Calif. rather than just identifying the state of California. These and other metrics may be further refined with respect to the gold or other higher levels of subscription, where for example, the preferred time metric may be refined as a weighted average based on actual actions such that the time is weighted to favor times where the customer actually purchased something online or performed some other action. The geographic location may also be refined for these higher levels of subscription to specify the zip code.

As yet another example of a profile, the following Table 5 illustrates a profile that is defined in accordance with a metric referred to as "RFM," which stands for Recently, Frequency and Magnitude or Monetary:

TABLE 5

| Categories | 1 Day (Action) | 1 Week (Action) | 1 Month (Action) | 1 Year (Action) |
|---|---|---|---|---|
| Shopping | 1 (0) | 2 (1) | 5 (1) | 153 (35) |
| Hobbies | 0 | 2 (0) | 3 (1) | 198 (17) |
| Travel | 0 | 0 | 4 (3) | 57 (12) |
| ... | ... | ... | ... | ... |

The above Table 5 includes five columns defining RFM data, where the first column defines categories of interest or marketing categories, and the following columns two through five provide varying durations representative of the "recently" portion of the RFM metric. The "frequency" portion of the RFM metric is represented by the number of times the customer has directed customer device 18A to visit websites in each time span. For example, customer device 18A visited a shopping website in the last day one time, the last week two times, the last month five times and the last year 153 times. The "magnitude" or "monetary" aspect of the RFM metric is represented by the number of times the user performed an action associated with each of these visits, which is represented in Table 5 as a value enclosed in parenthesis. For example, according to Table 5, customer device 18A performed an action, e.g., purchased a product, with respect to a visit to one of the shopping sites provided by content providers 24 in the last week. This RFM profile may also be generated in accordance with varying subscription levels, much as described above with respect to Tables 1-4B.

A profile determined in accordance with the RFM metric may provide valuable insight into the tendencies of a given customer and provide ad networks 26 with a way of more accurately targeting a given customer. With respect to the example profile presented in Table 5, one of ad networks 26 may determine that the customer has greatly reduced most of his online activities over the more recent months by comparing the frequency ratios over the various time spans. Moreover, this one of ad networks 26 may determine that the magnitude has also significantly decreased recently. Based on this assessment, ad network 26 may prefer to provide advertisements that are paid for on a CPM or impression basis rather than on a CPA or an action basis, as the advertiser assumes the risk or loss of revenue with respect to a CPA cost or revenue model. Again, these CPM, CPC, and CPA revenue models are discussed in more detail below.

Notably, the history logs stored to history database 30C may be generated on a per customer basis to accurately track individual customer behavior, interests and actions over time. However, EAMS 12 may not necessarily generate profile data in the same manner and may instead generate profile data to represent composite behavior for a cluster of a plurality of customers of service provider network 16. As one example, EAMS 12 may generate profile data that reflects customers located within a same geographical area, such as a same zip code, street, city, or state. The cluster may also be defined to reflect customers located within a common subnet of service provider network 16. This clustering of customers within profile data may further enhance the anonymity of individual customers. Much as the subscription level may control the level of granularity with respect to the accuracy of the profile data, so too may the subscription level of a given subscriber reflect the relative size of the clusters. In other words, a gold level subscriber may receive profile data reflective of individual customers while a basic level subscriber may receive profile data reflective of a group of customers located within the same state.

In any event, profiler module 46 may, after generating the profile, may generate a last mile cookie based on the profile, as described above, and pass this last mile cookie to privacy module 48 (74). Privacy module 48 may generate a pseudonym in the manner described above, e.g., by employing hash module 50 to perform a one-way hash on the MAC address included within the last mile cookie (76). Privacy module 48 may then forward the network communication with the last mile cookie as privacy network communication 56C back to profiler module 46, which may include encryption module 52 to encrypt the last mile cookie in accordance with the encryption keys stored to the corresponding subscriber record within subscriber database 30C (78). After encrypting the cookie, profile module 46 may insert the last mile cookie back into the communication and forward the communication back to channel modules 44, which may prepare communication 56A for forwarding over the corresponding channel and forward this communication to a corresponding one of interfaces 34 as communication 28A' (80). This one of interfaces 34 may then forward communication 28A' to its intended destination device, e.g., one of content providers 24 (66).

The above techniques related to privacy and profiling may represent a paradigm shift in terms of online advertising. Rather than profile and target ads from the last mile, the techniques facilitate advertising within computer networks at the last mile. These techniques may promote consumer/customer privacy while simultaneously improving application-layer information collection. The profile data stored to profile database 30 may be leveraged in a number of ways to improve ad targeting, as well as, the accuracy and completeness of metadata. Various uses of this data as well as other features are described below with respect to FIGS. 4-14.

Figure 4:
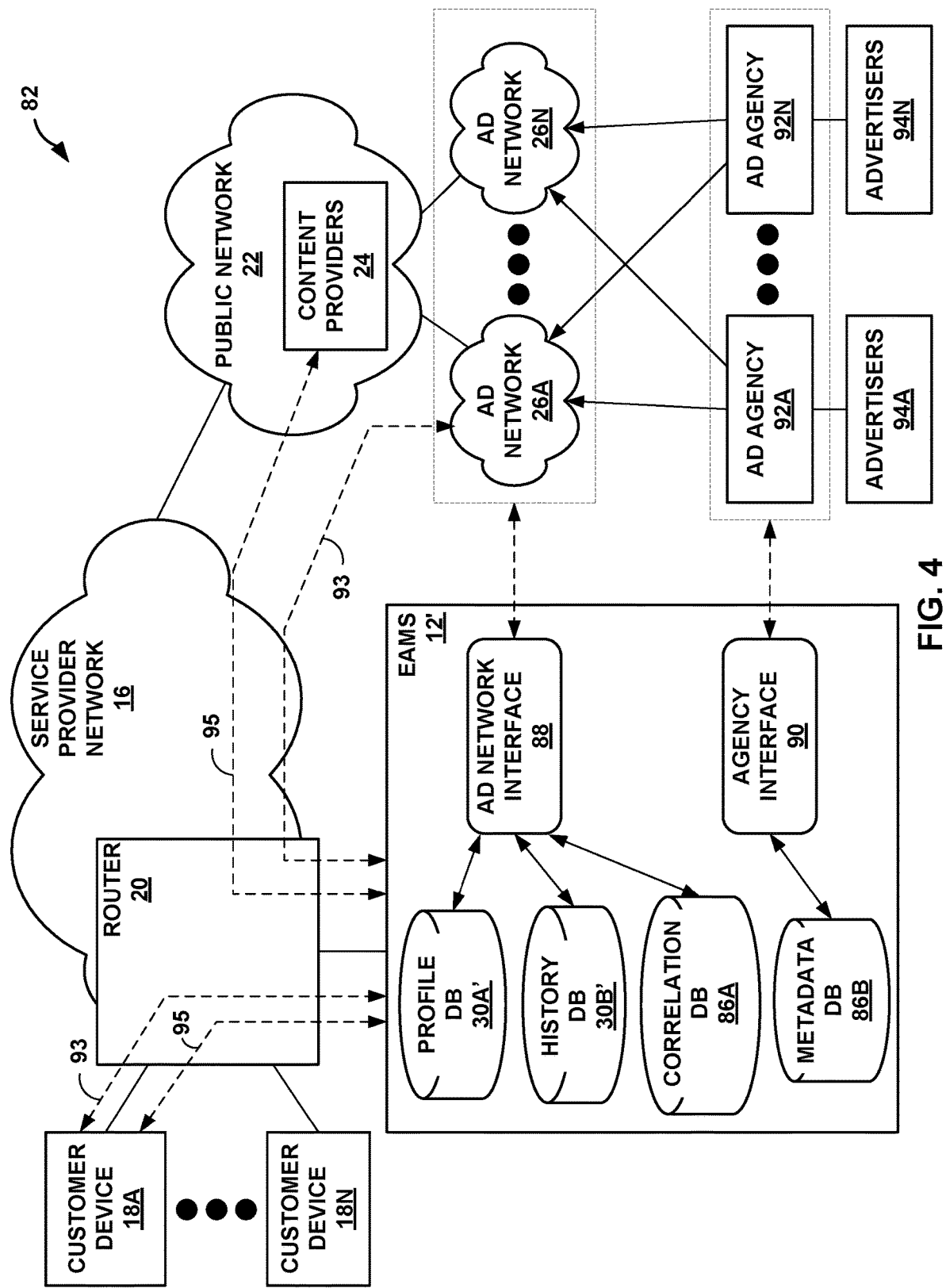
FIG. 4 is a block diagram illustrating another network system in which a network device performs correlation and evaluation aspects of the last mile online advertising techniques described in this disclosure.

FIG. 4 is a block diagram illustrating another network system 82 in which a network device performs correlation and evaluation aspects of the last mile online advertising techniques described in this disclosure. In particular, a network device referred to as an Edge advertisement management system (EAMS) 12' may perform these data serving aspects of the last mile online advertising techniques described in this disclosure. The use of prime, double prime, and so on with respect to devices and components, as well as, communications refers herein to a device, component or communication that is similar to the device, component or communication lacking any primes. Primes may therefore be used for ease of illustration purposes and should not be construed in any way as limiting on the techniques described in this disclosure EAMS 12' may be similar to EAMS 12 described with respect to FIGS. 1-3. In some instances, EAMS 12' may implement one or more of the profiling and privacy aspects of the last mile online advertising techniques described above with respect to EAMS 12. In particular, EAMS 12' may maintain a profile database 30A' ("profile DB 30A'") similar to profile database 30A and a history database 30B' ("history DB 30B'") similar to history database 30B. EAMS 12' may generate profile data in the manner described above from history data defining the above described history logs. Unlike EAMS 12, however, EAMS 12' may further include a correlation database 86A ("correlation DB 86A") that stores information correlating "clicks" by customer devices 18 on advertisements to various actions, such as filling out a form requesting more information for a service offered in an advertisement and purchasing a product featured in an advertisement. EAMS 12' may also include an ad network interface 88, which may be similar to ad network interface 54 shown in FIG. 2 only ad network interface 88 may be extended to provide a standard interface by which ad networks 26 may access profile database 30A', history database 30B' and correlation database 86A.

EAMS 12' may also include a metadata database 86B ("metadata DB 86B") that stores metadata generated by EAMS 12' concerning the effectiveness of various ad networks 26. This metadata may provide various measures by which to evaluate a given one of ad networks 26. For example, metadata may describe the effectiveness of an ad network 26 to reach certain target audiences, such as audiences ages 20 and under, 21 to 30, 31 to 40, 41 to 50, 51 to 60, 61 and up, or any other conceivable sub-division of target audiences, including target audiences of a combination of factors. Many of these factors may be related to the demographic information collected above.

In any event, EAMS 12' may further include an agency interface 90 by which ad agencies, such as ad agencies 92A-92N ("ad agencies 92"), may access metadata. Agency interface 90 may comprise an API that provides a standard interface by which ad agencies 92 may access metadata database 86B. Ad agencies 92 may interface with metadata database 86B to view, search or otherwise mine metadata stored to metadata database 86B. As one example, ad agencies 92 may interface with metadata database 86B via interface 90 to view the metadata in accordance with the above described RFM model such that ad agencies 92 who contract with ad networks 26 may evaluate trends with respect to the effectiveness of these ad networks 26 in serving advertisements.

To illustrate the correlation and evaluation aspects of the techniques described in this disclosure, consider the example of FIG. 4, where one of customer devices 18 of a service provider network 16, such as customer device 18A, issues one of network communications 93, requesting, for example, additional content, e.g., an advertisement, from one of ad networks 26A. This particular communication originating from customer device 18A is referred to below as communication 93A to facilitate discussion of various communications. It is further assumed for purposes of illustration that this communication 93A includes a first-mile cookie.

Continuing the illustrating, router 20 may route this communication 93A in the manner described above through EAMS 12' and EAMS 12' may update history database 30B' to track communication 93A in the manner described above. EAMS 12' may replace the first mile cookie with a last mile cookie, which again is consistent with the description of EAMS 12 above. EAMS 12' forwards this altered communication back to router 20 as communication 93B, which in turn forwards communication 93B to one of ad networks 26, such as ad network 26A.

Ad network 26A may select an advertisement based on the last mile cookie included within communication 93B, as described above. Alternatively, ad network 26N may access profile database 30A' via ad network interface 88 to retrieve the profile data stored for customer device 18A. In these alternative embodiments, EAMS 12' may be acting as a proxy and may establish a session with ad network 26N on behalf of customer device 18A to request the advertisement. EAMS 12' may use a unique port number for each of customer devices 18A and may map this port number to profiles stored to profile database 30A'. Ad network 26A may then request a profile using the port number specified in network communication 93B and EAMS 12' may return the profile associated with this port number to ad network 26A. EAMS 12' may randomly assign this port number for each session it uses on behalf of customer device 18A and update its mapping to reflect the change in port number. This port mapping scheme may further mask an address (or more generally identity) statically assigned to customer device 18A. In any event, ad network 26A may select an advertisement based on profile data either as defined by the last mile cookie included within communication 93B or as retrieved from profile database 30B' via ad network interface 88.

Ad network 26A may then generate a response network communication 93C that includes the selected advertisement, which router 20 may again forward to EAMS 12'. EAMS 12' may track this communication 93C within history database 30B'. EAMS 12' may correlate this communication with customer device 18A again by way of the port number on which communication 93C was received. Thus, history logs stored to history database 30B' may also be mapped to port numbers. EAMS 12' may then forward this response 93C back to customer device 18A via router 20. Customer device 18A may render the advertisement and a customer operating customer device 18A may "click" on or otherwise select the advertisement causing customer device 18A to issue a one of network communications 95 that requests content associated with an advertiser sponsoring the advertisement, e.g., one of content providers 24. As with network communications 93, reference to individual ones of communications 95 may be denoted as communications 95A, 95B, and so on for purposes of facilitating the discussion of these communications 95. Router 20 once again forwards this one of communication 95 ("communication 95A") to EAMS 12', which in turn updates history database 30B' and profile database 30A'. EAMS 12' may further correlate the selection of the advertisement, e.g., communication 95A, to the response communication 93C that served the selected advertisement.

EAMS 12' may then forward this communication 95A to router 20, which in turn forwards communication 95A to the one of content providers 24 that sponsored the advertisement. This one of content providers 24 may return content regarding the subject of the advertisement, such as an offer to buy a product (e.g., an item, good or service), an offer to receive additional information, or any other content that denotes a measurable action. This one of content providers 24 may return the content via a response network communication 95B. EAMS 12' may receive communication 95B from router 20 and track this communication within history database 30B' and possibly update profile database 30B' to reflect the potential for an action by customer device 18A. EAMS 12' may also update correlation database 86A to correlate this service of the content that may enable an action in response to an advertisement. EAMS 12' may then forward communication 95B back to customer device 18A via router 20.

While described above as tracking each and every action with respect to a given customer device 18A, EAMS 12' may implement the techniques to track various types of network communications, such as those network communications that indicate an ad has been selected and those network communications indicating an action has been taken, e.g., a customer has directed customer device 18A to purchase a particular product. By reducing the scope of the tracking, less storage space may be required within history database 30B'. Moreover, the reducing in the scope of the tracking may reduce use of computational resources required to track every single communication. EAMS 12' may be configurable with respect to the scope, time frame, and granularity of the tracking, where, for example, a network administrator may configure EAMS 12' to track particular messages for select services over a set time frame, such as a sliding one month or one year window.

Returning to the above illustration, it is assumed, again for purposes of illustration, that the customer decides not to commit to any action with respect to this content and instead the customer directs customer device 18A to browse other sites, looking possibly for a better deal or other advertisements regarding competing products, goods or services to the products, goods or services offered in the served advertisement. If, at this point, ad network 26A decided to source (which may be used herein interchangeably with "place") this advertisement under a CPA revenue model, ad network 26A only receives ad revenue if customer completes an action or transaction associated with product featured in the advertisement. If ad network 26A decided to service this advertisement under either a CPC or CPM revenue model, ad network 26A would have received ad revenue for the customer directing customer device 18A to select or click the advertisement (under the CPC revenue model) or for merely placing the advertisement to be rendered by customer device 18A (under the CPM revenue model).

Considering that commitment to an action by customer device 18A typically occurs much less than impressions and clicks and that such actions provide the most revenue for advertiser 94A-94N (e.g., due to the customer actually purchasing the advertised product), the advertisers typically pay a higher cost for ads sourced under the CPA revenue model. Moreover, in the CPA model, ad networks 26A assume the risk of a consumer choosing to ignore the advertisement and thus expect to be compensated more for assuming this risk. Thus, improving the capture rate or effectiveness of placing advertisements under the CPA model may therefore greatly improve ad revenues for ad networks 26. Considering the more comprehensive information provided by profile data that details a customer's behavior, interests and actions across varying channels, time horizons and domains, ad networks 26A may better gauge under which revenue model, e.g., CPM, CPC, CPA, to serve a particular advertisement. In this respect, the techniques described in this disclosure may enable ad networks 26 to increase ad revenue by more accurately gauging the amount and accuracy of profiling information for a given customer as well as where a customer lies with respect to his level of commitment to a particular product.

For example, EAMS 12' may correlate ad placements by ad networks with customers and determine a number of times a given customer has seen an advertisement for this product. EAMS 12' may also analyze the profile data for this customer so as to identify any trends with respect to the customer's behavior, interests and actions indicative of a level of interest. EAMS 12' may locate where this interest lies with respect to an Awareness, Intent, Desire, and Action (AIDA) model. EAMS 12' may then update the profile for this customer, or associated one of customer devices 18 to be more precise, to include this interest level as preference data. As the history log for this customer may more accurately track this customer's action across multiple channels or services, EAMS 12' may more accurately identify this interest level and its relationship to the AIDA model.

Based on this preference data defining the interest level, ad networks 26 may then more accurately determine in real-time whether to source advertisements that are contracted under the CPM, CPC or CPA revenue model. To illustrate, in response to receiving a request having a cookie containing a profile that specifies preference data defining an interest level that suggests the customer is in the range of "awareness" in the AIDA model, ad networks 26 may select to source an advertisement under the CPM revenue model. In response to receiving a cookie from EAMS 12' in which the profile data suggest an interest level (as defined by preference data) for the customer in the range of "intent" in the AIDA model, ad networks 26 may select to source an advertisement under the CPC revenue model. In response to receiving an interest level suggesting the customer is in the range of "desire" or "action" in the AIDA model, ad networks 26 may select to source an advertisement under the CPA revenue model. This level of interest with respect to the AIDA model may be updated with respect to each category, sub-category, and niche (if available to the particular subscriber) within the profile data. The high level of visibility provided by history database 30B' may therefore enable EAMS 12' to more accurately identify this interest level and promote more efficient ad placement with respect to the various ad placement revenue models.

In some instances, rather than include this interest level within the profile communicated in a cookie, EAMS 12' may perform the above data mining of profile and history databases 30A', 30B' in response to a request from one of ad network 26 via ad network interface 88. EAMS 12' may, in addition to determining the interest level, evaluate the interest with respect to various ad revenue models and recommend one of the ad revenue models with respect to a given advertisement this one of ad networks 26 would like to serve or at least with respect to particular keywords or other references by which to evaluate the level of interest. Ad networks 26 may then receive this recommendation and source a given advertisement based on this recommendation.

This correlation aspect of the technique may also enable ad networks 26 to provide a CPA infrastructure to those of content providers 24 where advertisements placed under the CPA revenue model are typically ineffective. For example, any of content providers 24 that lack or do not provide a check-out or e-commerce application may be unable to successfully track purchase actions. Consequently, ad networks 26 may not correlate advertisement "clicks" or selections with a purchase action when the advertisement is presented via these content providers 24, even though the customer may purchase the item after clicking on the advertisement from a different content provider. As a result, ad networks 26 may not source CPA advertisements for these content providers 24.

Continuing the example above, where the customer directed customer device 18A not to commit to the action to illustrate how the CPA infrastructure provided by EAMS 12' may enable CPA for these content providers 24, it is assumed that at some later point after the customer decided not to commit that the customer directed customer device 18A to traverse to a different one of content providers 24 that provided the same product, good or service offered in the advertisement. To illustrate why a customer may have elected not to commit, consider that the advertisement may have offered the customer a 10 percent discount on a particular software product available for purchase at a first one of content providers 24. The consumer may have searched content providers 24 to locate a competing merchant (or reseller) and purchased the same software product at an even lower discount from a second one of content providers 24 operated by the competing merchant (or reseller). Yet, in this instance, the advertiser most likely does not care whether the consumer purchased at the first or second one of content providers 24, however, this potential action may be lost to both the content provider that initially hosted the advertisement and the ad network that sourced the advertisement.

Unlike conventional first mile cookies that typically are not transferrable between domains and therefore may be limited with respect to tracking actions that do not directly follow an ad click, EAMS 12' may track this purchase despite the potentially different domains and update history database 84B to reflect this action. EAMS 12' may moreover correlate this purchase with the previous selection of the advertisement and inform ad network 26A of this action via ad network interface 88. As a result of overcoming this limitation of first mile cookies, content providers 24 that are typically not effective candidates for hosting CPA advertisements may host ads under the CPA revenue model and ad agencies 92 may increase ad revenues by dispersing more ads under the CPA revenue model.

To restate this correlation aspect in other words, router 20 may receive a first network communication from customer device 18A, where the communication includes a URL specifying one of the advertisements sourced by one of advertisement networks 26, e.g., ad network 26A. Router 20 forwards this first network communication to EAMS 12', where profiler module 46' logs this communication to a history log stored within history database 30B' for customer device 18A to indicate that the particular advertisement has been sourced to the customer.

Router 20 may then receive a second network communication from customer device 18A indicating that the previously received advertisement has now been selected by (e.g., clicked on) a customer operating customer device 18A. Since the customer has clicked on the advertisement, this second network communication typically request content from one of the content providers 24 referred to above, e.g., a web page for purchasing a product. In other words, this requested content sourced by the content provider 24 typically includes description of the advertised product and allows the customer to take an action (e.g., effect a purchase) with respect to the product as required under a CPA revenue model. Router 20 forwards this second network communication to EAMS 12', where profiler module 46' logs this communication to the same history log within history database 30B' as before to indicate that the customer has been presented with the product description and content necessary for taking the requisite action.

In the event the customer chooses to complete the purchase of the advertised product after clicking on the advertisement, EAMS 12' receives communications indicative of the action and updates history database 30B accordingly. However, the customer may choose not to perform the action at that time but rather may return at a subsequent time, possible using a different communication session, to view and purchase the product. In this case, router 20 may receive a third network communication at some subsequent time indicating that the customer committed to the action possibly using a different communication session with a different content provider. Consequently, without EAMS 12' and correlation layer 46C, ad network 26A may not otherwise be able to collect any ad revenue through the presentation of the advertisement under the CPA ad revenue model considering that action (i.e., purchase) may not have been easily traceable to the presented advertisement.

However, in accordance with the techniques described in this disclosure, router 20 forwards this third communication to EAMS 12', where profiler module 46' logs this communication to the same history log within history database 30B' as before. EAMS 12' then correlates the first, second and third network communications to identify instances when the customer selects the one of the advertisements and does not immediately take the requisite action with respect to the product but instead commits to the action at some later time, possibly using a different communication session with a different content provider. Thus, this correlation aspect may allow ad networks to more accurately capture ad revenue.

Accordingly, the correlation aspect of the last mile online advertising techniques may more effectively correlate customer actions with advertisements and may thereby improve the capture rate of CPA related revenues for ad networks 26. In effect, this aspect of the techniques may reduce risk associated with ads served under the CPA revenue model by leveraging the increased visibility of customer actions provided through tracking customer actions at the last mile rather than the first mile.

This increased visibility provided by profile database 30A' and history database 30B' may also be leveraged to generate metadata defining the effectiveness of these various ad networks 26. EAMS 12' may mine history database 30B' and to expose various trends with respect to ad networks 26 and then segment these trends into target groups using profile data stored to database 30A' that defines demographic information. To then evaluate effectiveness of various advertisements within these groups, EAMS 12' may mine correlation database 30B' to expose correlations between selection of an advertisement and a following action, even if that actions spans domains, e.g., website, or in some instances, channels, as last mile data collection is not limited in these respects for the reasons described above.

Upon generating metadata in this nature and storing this metadata to metadata database 86B, EAMS 12' may expose agency interface 90 to ad agencies 94. Ad agencies 94 may develop an advertisement for a targeted group or audience and interface with metadata database 86B via agency interface 90 to determine the most effective one of ad networks 26 for placing the advertisement or particular versions of the advertisements to reach the targeted audience. For example, ad agency 92A may develop a first version of an advertisement for CPC revenue models and a second version for a CPA revenue model. Ad agency 92A may then access metadata database 86B to determine which of ad networks 26 are most effective in placing the first version with respect to a target group and most effective in placing the second version with respect to the target group, as competing ad networks 26 may employ different decision making processes with respect to serving or otherwise placing an advertisement for the CPC and CPA related advertisements. Given access to this information, ad agencies 92A may more effectively pursue a cost benefit analysis to select one or more of ad networks 26 with which to place various versions of the advertisements. In some instances, EAMS 12' may even perform this cost-benefit analysis for ad agencies 92 assuming costs are provided either by ad networks 26 or ad agencies 92.

In both aspects of the last mile online advertising techniques, EAMS 12' leverages the improved visibility provided by profile and history databases 30A' and 30B'. By leveraging these databases in this manner, EAMS 12' may improve ad revenues for ad networks 26 through more accurate correlation while also improving the accuracy of cost benefit analysis performed by ad agencies 92 through more accurate evaluation of ad networks 26 performance.

Figure 5:
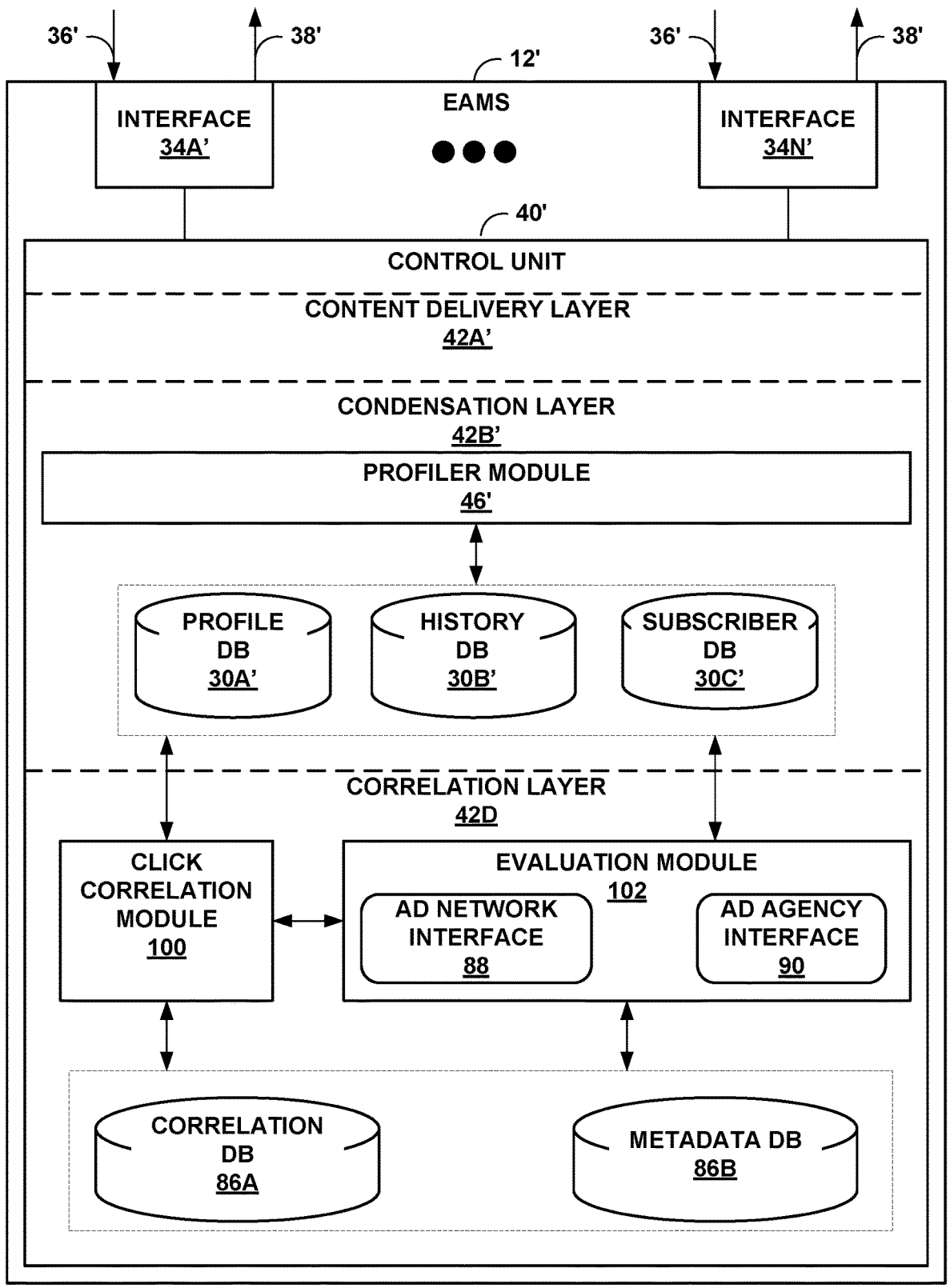
FIG. 5 is a block diagram illustrating another example embodiment of an edge advertisement management system in more detail.

FIG. 5 is a block diagram illustrating an example embodiment of EAMS 12' of FIG. 4 in more detail. As mentioned above, EAMS 12' may be substantially similar to EAMS 12 described above with respect to FIGS. 1-3. Particularly, EAMS 12' may include many similar, if not substantially the same, components as that of EAMS 12 shown with respect to FIG. 2 in that EAMS 12' may include similar interfaces 34A'-34N' ("interfaces 34'") and a similar control unit 40' to interfaces 34 and control unit 40 of EAMS 12, respectively.

Control unit 40' of EAMS 12', similar to control unit 40, includes a content delivery layer 42A' and condensation layer 42B', where condensation layer 42B' includes a similar profiler module 46'. Profiler module 46' may update history database 30B' to track selections of advertisements by customer devices 18 and actions committed to or transactions completed by customer devices 18. Profiler module 46' may also update profile data stored to profile database 30A' as described above with respect to profiler module 46 by mining history database 30B'.

However, unlike EAMS 12, control unit 40' of EAMS 12' includes correlation layer 42D. Correlation layer 42D includes a click correlation module 100 and an evaluation module 102. Correlation layer 42D may generally correlate network requests from customers to purchase goods or services from content providers 24 with any of the electronic advertisements previously presented to the customers by ad networks 26. Correlation layer 42D may also generally evaluate the correlation to determine an effectiveness of each of these advertisements typically on the aggregate with respect to advertisements sourced by each of the different ones of ad networks 26.

Click correlation module 100 may mine or otherwise traverse history database 30B' to identify correlations between advertisement selections or "clicks" and successive actions. Correlation module 100 may generate correlation data that defines these correlations and stores these correlations to correlation database 86A. Evaluation module 102 may represent a module that evaluates the effectiveness of various advertisements sourced by ad networks 26. Evaluation module 102 may store data defining this effectiveness to metadata database 86B. This evaluation or effectiveness data may be referred to as "metadata" insomuch that this metadata represent data concerning other data.

Figure 6:
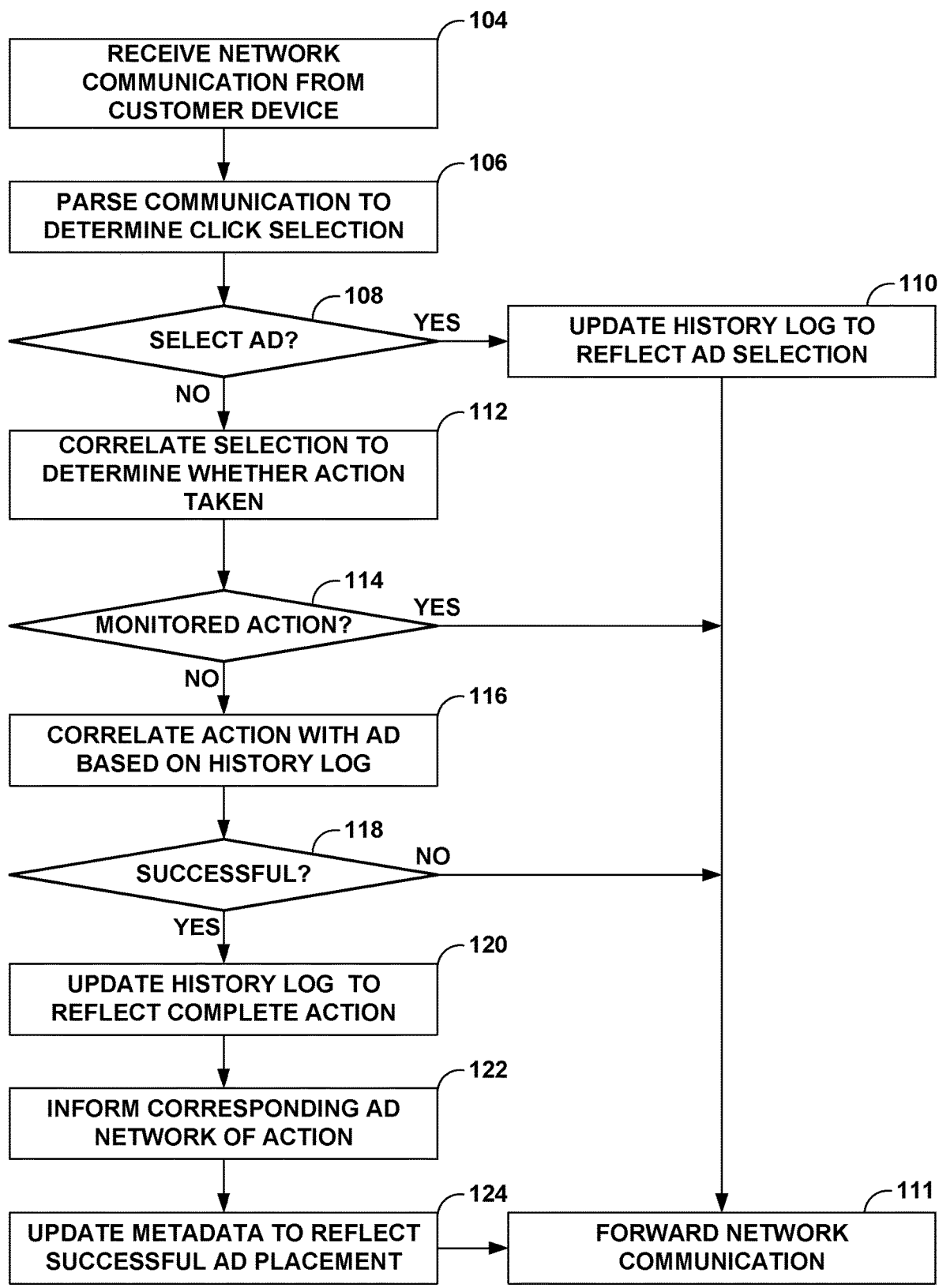
FIG. 6 is a flowchart illustrating example operation of a network device in implementing the correlation and evaluation aspects of the last mile online advertising techniques described in this disclosure.

FIG. 6 is a flowchart illustrating example operation of a network device, such as EAMS 12' of FIG. 5, in implementing the correlation and evaluation aspects of the last mile online advertising techniques described in this disclosure. Initially, EAMS 12' and, particularly one of interfaces 34', receive a network communication, such as network communication 96, for example, from a customer device, such as customer device 18A (104). Click correlation module 100 of control unit 40' may receive this communication 96 via the lower layers 42A, 42B and parse this communication to determine an URL or other identifier (e.g., Uniform Resource Identifier or URI) associated with a click selection (106).

Next, click correlation module 100 determines whether this selection is associated with the selection of an advertisement by comparing the parsed URL with a URLs stored to the history log associated with customer device 18A in history database 30B' (108). By traversing the history log in this manner, click correlation module 100 may in effect determine whether the parsed URL from the communication correlates with an URL provided by an advertisement. For example, an advertisement for a product may provide a URL that links the advertisement to a webpage provided by one of content providers 24 for that product. If an ad is selected, e.g., the URL is correlated with another URL provided by the advertisement ("YES" 108), click correlation module 100 updates the history log for the associated customer in history database 30B' to reflect the selection of the ad and forwards this network communication to its intended destination, e.g., one of content providers 24 and/or ad networks 26 (111).

If not indicative of a selection of an advertisement, e.g., click correlation module 100 did not correlate the parsed URL with a URL provided by a previously presented advertisement ("NO" 108), click correlation module 100 next correlates the URL associated with the selection to the history log to determine whether the URL is indicative of an action being monitored (112). Click correlation module 100 may perform this correlation while attempting to correlate the URL to determine whether an ad was selected or may perform this correlation as a separate step. In any event, click correlation module 100 may, for example, determine whether the URL text identifies a purchase of a particular product as identified as a product code or serial number, an email text entry field or any text indicative of an action.

If the communication does not indicate or otherwise relate to a monitored action ("NO" 114), click correlation module may forward this network communication to its intended destination, e.g., one of content providers 24 and/or ad networks 26 (111). Assuming that click correlation module 100 determines that the URL does reflect a monitored action ("YES" 114), click correlation module 100 may attempt to correlate this action with a previously presented ad based on the history log (116). By virtue of profiler module 46' maintaining a comprehensive transactional record or log of at least each ad selection over time (e.g., between different sessions), between channels, across domains, click correlation module 100 may determine correlation between ad selections and subsequent action that span time, sessions, channels and domains contrary to tracking enabled by conventional first-mile cookies. Click correlation module 100 may return, as described above, any previous ad selection that correlate with the current selection of the action and, based on the results of this correlation evaluation module 102 may determine whether the correlation was successful (118).

If, for example, no results are returned by click correlation module 100, evaluation module 102 may determine that the correlation was unsuccessful and forward the network communication to its intended destination ("NO" 188, 111). However, if at least one result is returned indicating a correlation between an previously presented advertisement and the selection of an action, evaluation module 102 may update the history log stored in history database 30B' for the one of customer devices 18A that originated the communication, inform the one of ad networks 26 that placed or sourced the advertisement of the ads success for billing purposes, and update metadata stored to metadata database 86B for this one of ad networks 26 to reflect the success of the advertisement (124-128). Evaluation module 102 may then forward the network communication to its intended destination (111).

Figure 7:
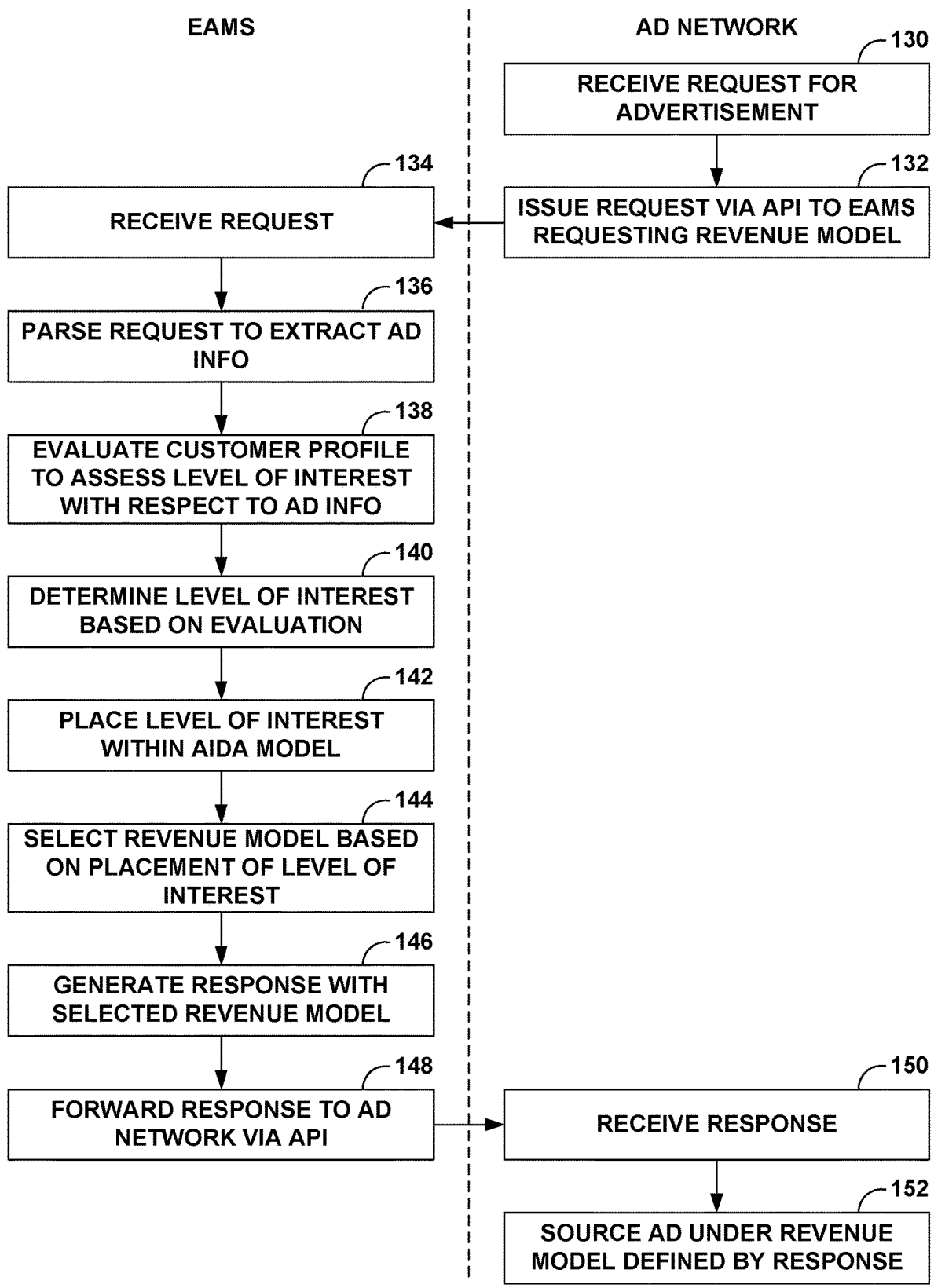
FIG. 7 is a flowchart illustrating example operation of a network device in implementing a revenue model recommendation aspect of the last mile online advertising techniques described in this disclosure.

FIG. 7 is a flowchart illustrating example operation of a network device, such as EAMS 12' of FIG. 5, in implementing a revenue model recommendation aspect of the last mile online advertising techniques described in this disclosure. Initially, one of ad networks 26, e.g., ad network 26A, may receive a request network communication for sourcing an advertisement from one of customer networks 18, as described above (130). This communication may include a last mile cookie that ad network 26A may decrypt to extract profile data, which it then uses to identify various interests of the customer in the manner described above. Also as described above, ad network 26A may select an advertisement based on this profile data and then issue a request via an API (represented as ad network interface 88 in FIG. 4) to EAMS 12' (132). This request may include the customer's pseudonym for the customer and may identify the advertisement or otherwise include information describing the type or category of advertisement being served.

Evaluation module 102 within control unit 40' of EAMS 12' shown in FIG. 5 may receive this request and parse this request to extract the advertisement information (134, 136). Evaluation module 102 may then evaluate profile data stored within profile database 30B' for this customer to assess a level of interest with respect to the advertisement information provided by way of the request (138). Evaluation module 102 may identify the customer, as one example, by the customer's pseudonym or, in the event EAMS acts as a content proxy, by way of a port number which ad network 26A may specify in the request. In any event, based on this evaluation of the customer's profile data versus the advertisement information, evaluation module 102 may determine in real-time a level of interest and then, as described above, place this level of interest within the AIDA model (140, 142). Evaluation module 144 may then select one of a plurality of revenue models, e.g., one of the CPM, CPC or CPA revenue models, based on the placement of the determined level of interest within the AIDA model (144).

After selecting this revenue model, evaluation module 102 may generate a response defining the selected revenue model and forward this response to ad network 26A via the API (146, 148). Ad network 26A may receive this response via the API and source the advertisement selected in the manner described above under the revenue model defined by the response (150, 152).

Notably, the above process may be carried out dynamically and possibly in real-time, where "real-time" may be defined as occurring in a span of time having low latency after the ad network has received a request to source an advertisement to a customer. In addition many, if not all, aspects of the techniques described in this disclosure may be implemented dynamically and possibly in real-time, including the above described profiling and privacy aspects, the above described correlation and evaluation aspects, and mass-customization and ad sourcing aspects described below.

This recommendation may, as described above, result in the ad networks potentially realizing more ad revenue. As a part of providing this service, the various parties or entities that enable or otherwise participate in this recommendation service may negotiation revenue splitting agreements by which to split this increased ad revenue. In one example, the notation may result in splitting of revenue between an entity that maintains the service provider network, an entity that maintains the EAMS to provide analytics and recommend the optimal revenue model in real-time, and the advertising network sourcing the electronic advertisements.

Figure 8:
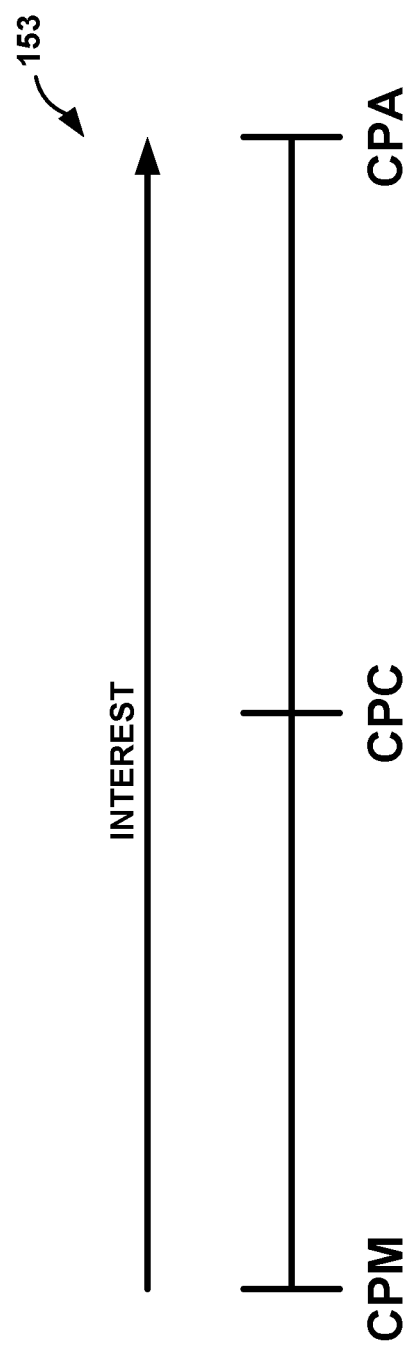
FIG. 8 is an illustration of a line diagram showing a sliding scale of interest with respect to ad revenue models.

FIG. 8 is an illustration of a line diagram 153 showing a sliding scale of interest with respect to ad revenue models. As shown in the example of FIG. 8, as customer interest in a given product increases, ad networks 26 may select from the above described three ad revenue models. The profile data provided in the last mile cookie may identify this level of interest as a percentage or other relative value such that ad networks 26 may source ads under the CPM revenue model for lower values, the CPC revenue model for moderate values and the CPA revenue model for higher values. In this respect, the profile may enable ad networks 26 to more accurate select under which of a plurality of revenue models to source a given advertisement.

Figure 9:
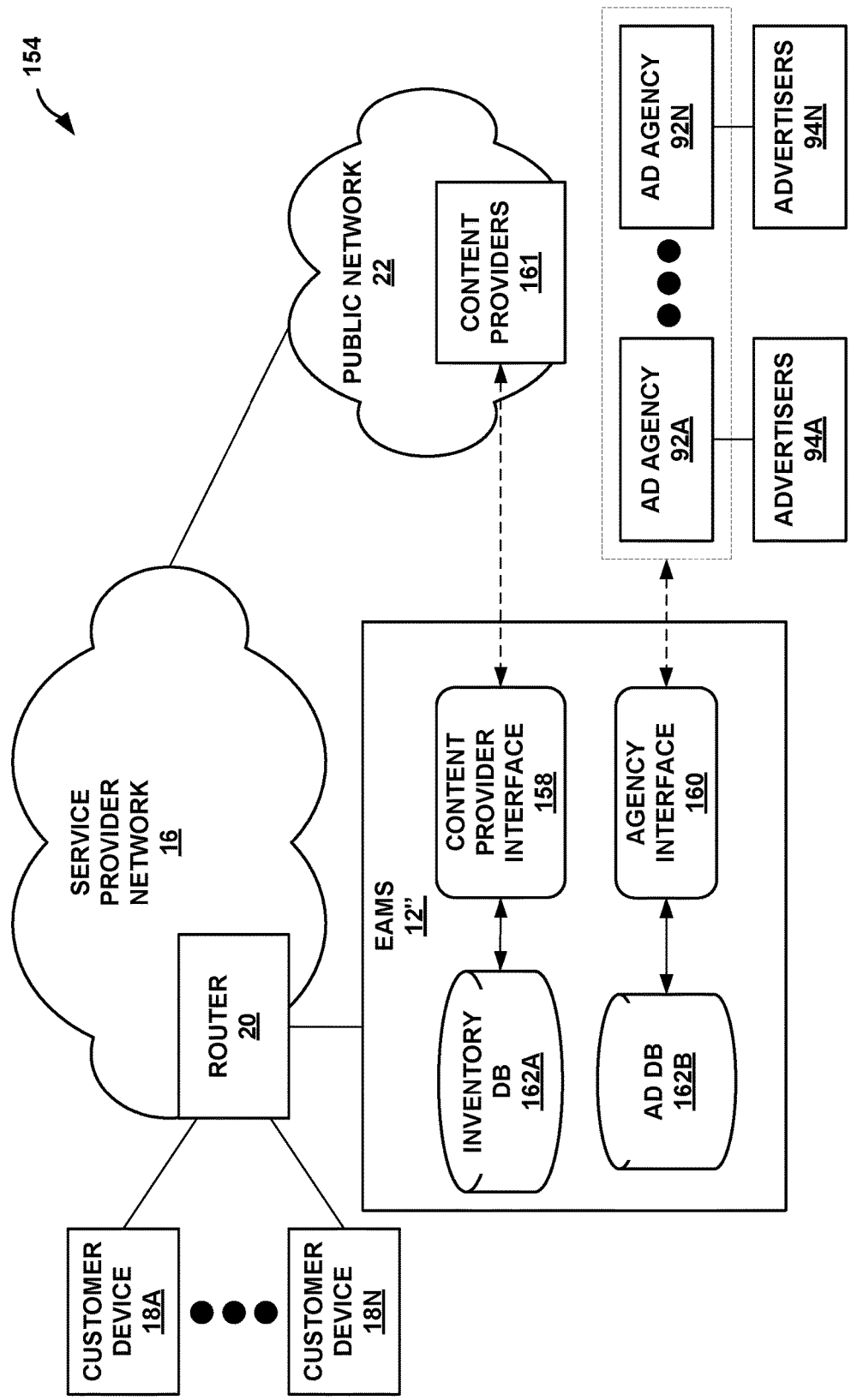
FIG. 9 is a block diagram illustrating an example network system in which a network device implements mass-customization and ad sourcing aspects of the last mile online advertising techniques described in this disclosure.

FIG. 9 is a block diagram illustrating an example network system 154 in which a network device implements mass-customization and ad sourcing aspects of the last mile online advertising techniques described in this disclosure. In particular, this network device is shown as EAMS 12" in FIG. 9 and EAMS 12" may implement these additional mass-customization and ad sourcing aspects in addition to the various aspects described above. Particularly, EAMS 12" may implement the tracking and profiling aspects described above to maintain a profile database 30A" and a history database 30B" (which are not shown in FIG. 9 for ease of illustration purposes) that are similar to either one or both of profile databases 30A, 30A' and either one of or both history databases 30B, 30B'. EAMS 12" may leverage these databases 30A" and 30B" to provide its own ad network by which ad agencies 92 and content providers 24 may contract to provide advertisements to customer devices 18.

EAMS 12" may include a content provider interface 158 and an agency interface 160. Content provider interface 158 may represent an Application Programmers Interface (API) with which content providers 161 may interact to upload, delete, edit and otherwise manage inventory stored within an inventory database 162A ("inventory DB 162A"). Inventory may refer to available advertisement space within content provided by content providers 24. Content providers 161 may, with respect to these aspects of the techniques, comprise providers of a wide variety of content, including data or Internet content, such as webpages, but also video content, such as IPTV content that may be provided by traditional brick and mortar television companies (e.g., National Broadcast Company or NBC), voice content that may be provided via VoIP services from a VoIP content provider, and mobile content (e.g., text or Short Media Service (SMS) messages) provided by mobile service providers (e.g., AT&T Corporation).

Inventory may therefore refer to ad space within any number of contexts. For example, inventory may refer to an available ad slot in, for example, an IPTV video stream. Additionally, inventory may refer to an available ad space within a webpage or on a web site. Inventory may further refer to available ad space within digital newspapers downloaded by electronic reading devices (so-called "e-readers"). Inventory may also refer to available ad space or slots within VoIP applications, video conferencing application, where the ad space may be displayed by these applications during the voice call or alongside a video conference stream.

Agency interface 160 may be similar to agency interface 90 shown with respect to FIGS. 4 and 5 only extended to enable ad agencies 92 to upload, edit, delete, alter or otherwise manage advertisements stored within ad database 162B ("ad DB 162B"). Ad agencies 92 may contract with the owner and operator of EAMS 12" to provide these advertisements and EAMS 12" may match advertisements stored to ad database 162B with inventory stored to inventory database 162A. EAMS 12" may leverage the above profiling, privacy, correlation and metadata aspects of the techniques described above to select suitable ads based on a customer's profile, determining a suitable revenue model by which to place this selected ad, and source the advertisement in response to requests from customer devices 18.

With respect to the metadata aspects, EAMS 12" may employ the same techniques to collect metadata as described above only evaluate the effectiveness for placement of various ads with respect to various inventory from content providers 24 rather than ad networks 26. This shift in perspective from content providers 24 to ad networks 26 may occur as a result monitoring communications at the last mile rather than the first mile. In other words, EAMS 12" may monitor all operations of customer devices 18 across both domains and even channels over various time horizons and correlate these actions to provide a comprehensive profile that is not limited to particular ad networks or domains. Consequently, EAMS 12" may generate metadata concerning the effectiveness of placing ads with respect to inventory from each of content providers 161 and may adapt the matching of advertisements to inventory based on this metadata. This form of feedback-based evaluation using metadata may enable EAMS 12" to optimize ad placement to improve the effectiveness of advertisements for ad agencies 92 and ultimately advertisers 94.

Moreover, EAMS 12" via agency interface 160 may enable ad agencies 92 to define mass-customizable advertisements that comprise an advertisement template that can be dynamically populated by EAMS 12" with template data to adapt the advertisement to more effectively target a particular customer. Ad agencies 92 may define this advertisement template via agency interface 160 and define customizable template regions. To define a customizable template region, ad agencies 92 may identify, as one example, a marketing category to which this customizable template region relates, a type of advertisement that may be used to customize the template region (e.g., an discount offer, a brand impression, and a limited-time offer), a list of products or services for which the advertiser wishes to advertise, and any other type of factor that may be used to define a scope of the customizable template region. After defining this mass-customizable advertisement as a form of advertisement template, ad agencies 92 may next specify the template data that may be inserted into the customizable template regions via agency interface 160. This template data may be tagged with keywords or other information to enable EAMS 12" to properly populate customizable template regions. Ad database 162B may store this mass-customizable advertisement as both the advertisement template and the associated template data.

Upon matching one of these mass-customizable advertisements to a particular inventory in response to a request for an advertisement from customer device 18A, EAMS 12" may dynamically select one of the various template data based on profile data and history logs stored to profile database 30A" and history database 30B", respectively. EAMS 12" may, for example, inspect the tags associated with each of the various template data associated with the advertisement template and select one of these template data whose associated tags correspond with a high interest category within the profile data for this one of customer devices 18. EAMS 12" may then populate the one or more customizable template regions with the selected one or more of the template data and return this customized advertisement to the requesting one of customer devices 18. In this sense, EAMS 12" may customize the content of advertisements to fit rather than merely select an advertisement that fits an determined targeted group in which the requesting one of customer devices 18 resides.

Agency interface 160 may further enable ad agencies 92 to source advertisements across channels or services through a single interface. Due to the convergence of networks described above, EAMS 12" may access a plurality of channels and provide more comprehensive profiling as a result. As a result of this access, EAMS 12" may also source advertisement across these channels to potentially provide an increase in advertising opportunities. Moreover the single interface may reduce much of the overhead ad agencies 92's maintain with respect to managing multiple ad networks and content providers. Instead, ad agencies 92 may interface with a single agency interface 160 to place advertisements across channels.

As a further result of this cross-channel access, EAMS 12" source ads in a variety of different ways not typically achieved in first mile advertising. For example, EAMS 12" may monitor customer behavior via a profile and set triggers or other levels within the profile. These triggers may trigger when a particular level of interest in any one category rises above a set level, such as a level associated with the "intent" range or "action" range within the AIDA model. Upon activation of this trigger, EAMS 12" may correlate the trigger with the history log for this customer to generate correlation data and evaluate this correlation data to identify various products, items, services or goods that may have gave rise to the activation of the trigger. EAMS 12" may then automatically, without any user or other operator input, source an offer advertisement via a text message to the customer's mobile phone, which may be represented as customer device 18B. As an aside, EAMS 12" may source this ad under one of the CPA revenue model, as this trigger may identify the "intent" or "action" level of interest that translates to the CPA revenue model.

In some instances, this advertisement text message may include a barcode that the customer may use when purchasing the product, good, item or service from a physical store. Scanning the barcode may trigger this one of content providers 161 to upload the action to EAMS 12" via content provider interface 158, as the barcode may identify the advertisement network that sourced the ad, which in this case is the advertising network maintained by EAMS 12".

As another way in which EAMS 12" may source advertisements, EAMS 12" may source advertisements by way of an email to a customer's email address in response to a trigger. As yet another way, EAMS 12" may indirectly source advertisements by communicating the trigger to agency interface 160, which may then decide to issue a mail advertisement to the particular customer (if the customer's address is known) or via telemarketing (if the customer's phone number is known). The actions with respect to email advertisements may be captured by EAMS 12" as EAMS 12" monitors online communications. If the customer prints the email, such as the case may be when the email comprises a coupon, or in response to mail advertisements, content providers 24 may report the use of the coupon via content provider interface 158 and thereby permit EAMS 12" to capture this action for billing purposes.

Notably, these forms of more invasive advertising may require authorization from the customer before being permitted. In some instances, EAMS 12" may provide for granular authorization, which may enable the customer to tailor advertising to meet the customer's privacy tolerance levels. Often, this tolerance is set by service provider network 16 through contractual obligations. In any event, EAMS 12" may provide for tailored authorization such that, as one example, the forms of more invasive advertising are only allowed when interest levels reach a very high level or if the user has opted into or otherwise joined special programs offered by the service provider network, where tolerance of these forms of more invasive advertising are rewarded with reduced payments or other incentives with regard to the services provided by service provider network 16, as just a couple of examples.

Figure 10:
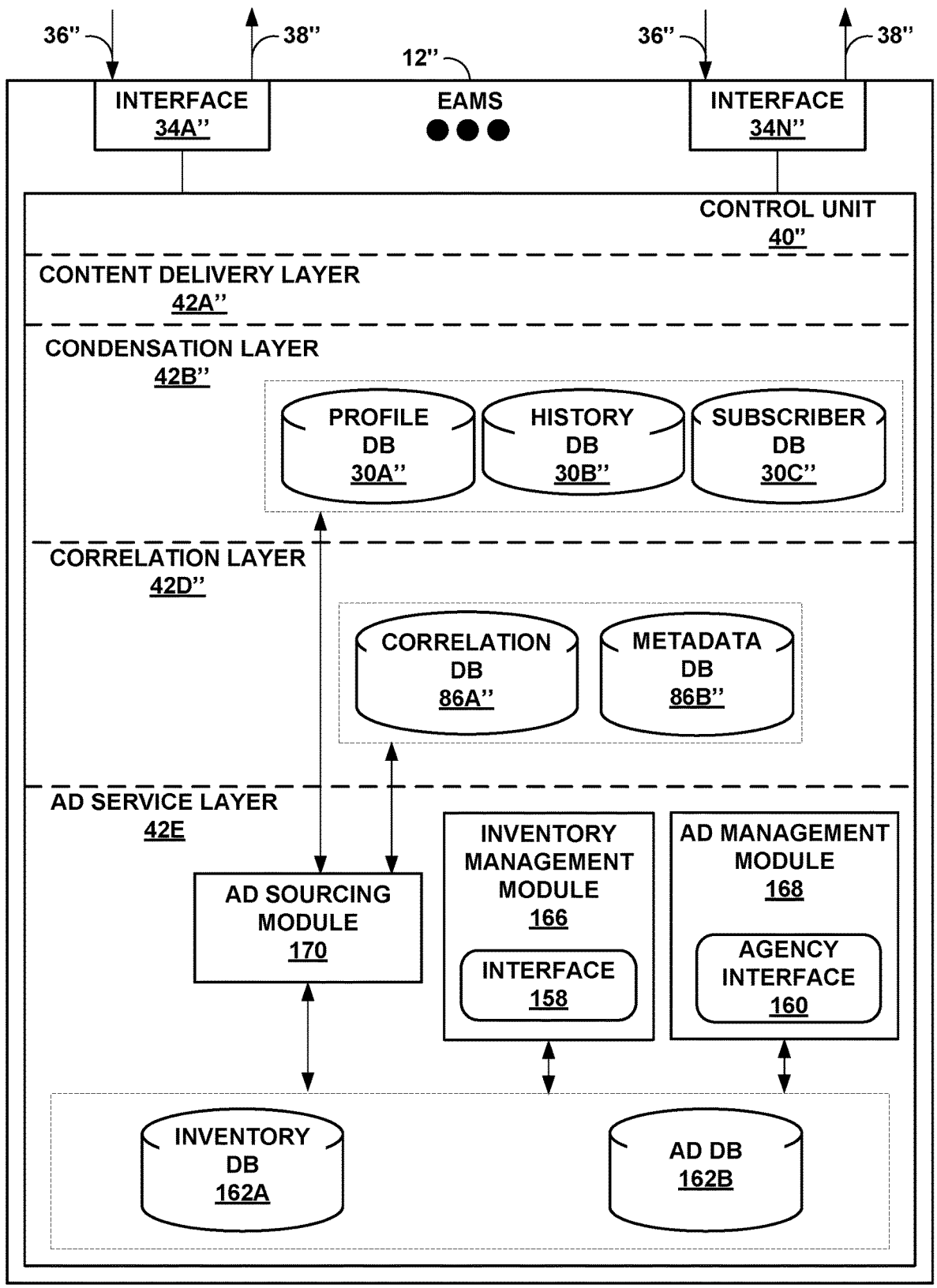
FIG. 10 is a block diagram illustrating another example embodiment of an edge advertisement management system in more detail.

FIG. 10 is a block diagram illustrating an example embodiment of EAMS 12" of FIG. 9 in more detail. As mentioned above, EAMS 12" may be substantially similar to EAMS 12' described above with respect to FIGS. 4-8. Particularly, EAMS 12" may include many similar, if not substantially the same, components as that of EAMS 12' shown with respect to FIG. 5 in that EAMS 12" may include similar interfaces 34A"-34N" ("interfaces 34"") and a similar control unit 40" to that of interfaces 34' and control unit 40'.

Control unit 40" of EAMS 12" includes a similar content delivery layer 42A' and condensation layer 42B' to those of control unit 40' of EAMS 12', where condensation layer 42B" may include a similar profiler module 46" (which is not shown in FIG. 10 for ease of illustration purposes). Profiler module 46" may update history database 30B" to track selections of advertisements by customer devices 18 and actions committed to or transaction completed by customer devices 18. Profiler module 46" may also update profile data stored to profile database 30A" as described above by mining history database 30B".

Control unit 40" may also include a correlation layer 42D" which, although not shown in FIG. 10 for ease of illustration purposes, may include a similar correlation module 100" and a similar evaluation module 102" as correlation layer 42D shown in FIG. 5. These two modules 100" and 102" may maintain similar correlation database 86A" and metadata database 86B".

However, unlike EAMS 12' or, for that matter, EAMS 12, control unit 40" of EAMS 12" also includes an ad services layer 42E. Ad services layer 42E includes an inventory management module 166, an ad management module 168 and an ad sourcing module 170. Ad services layer 42E may generally provide ad services by which content providers 161 may define and manage inventory and ad agencies 92 may define and manage advertisements. Ad services layer 42E may also evaluate the correlation to determine an effectiveness of each of these advertisements typically on the aggregate with respect to content providers 161. Ad services layer 42E may further provide for the automated and adaptive placement of advertisements through ad to inventory matching that leverages profile database 30A", history database 30C", correlation database 86A" and metadata database 86B".

Inventory management module 166 may represent a hardware and/or software module that provides content provider interface 158 (which is shown as "interface 158" in FIG. 10) by which content providers 161 may interface with inventory database 162A. Ad management module 168 may represent a hardware and/or software module that provides agency interface 160 by which ad agencies 92 may interface with ad database 162B. Ad sourcing module 170 may represent a hardware and/or software module that sources ads by, in some instances, matching ads to inventory and, in other instances, responding to triggers set within profile database to source advertisements, possibly in a cross-channel manner as described above.

Figure 11:
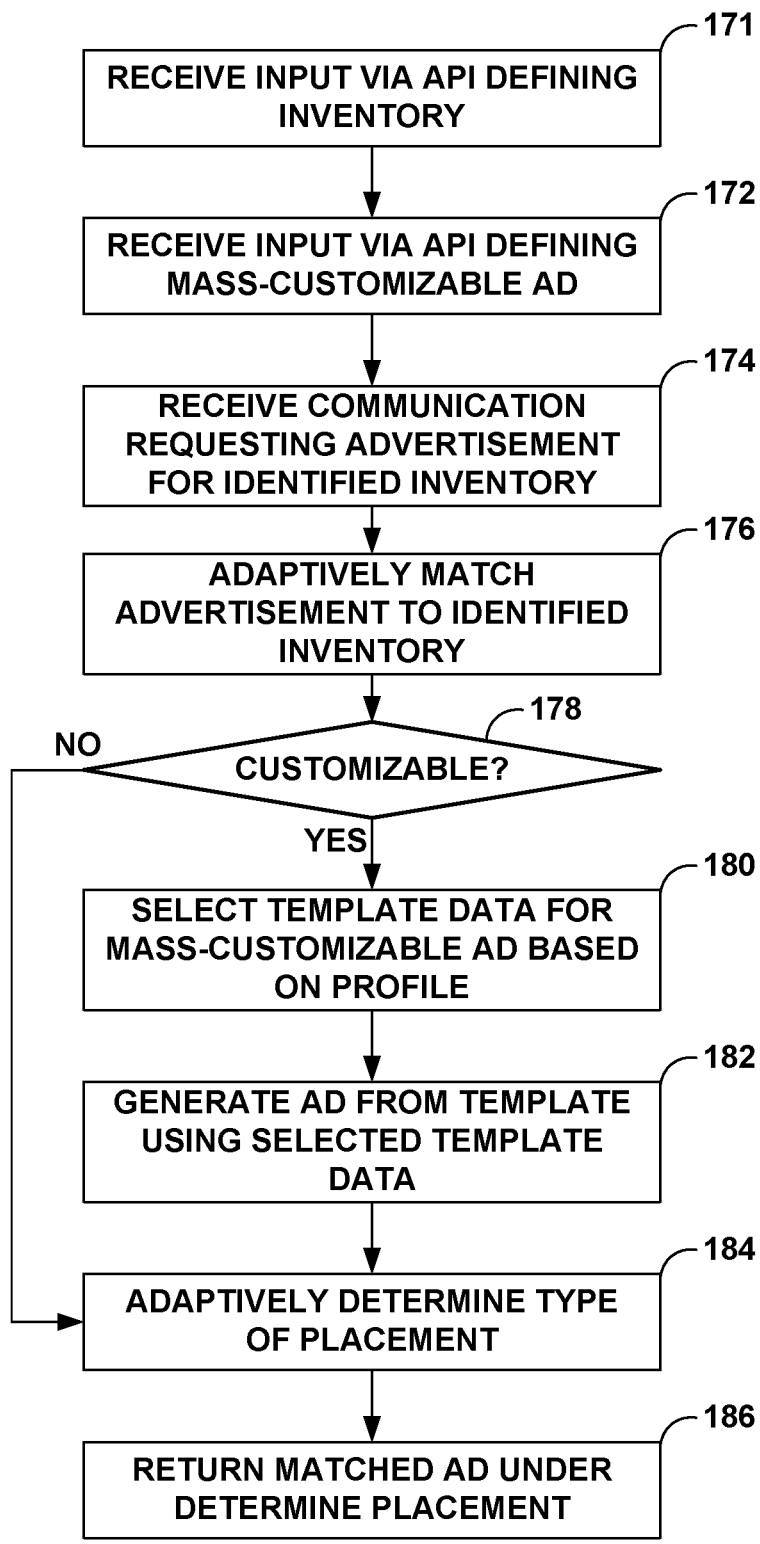
FIG. 11 is a flowchart illustrating example operation of a network device in implementing a mass-customization advertisement aspect of the last mile online advertising techniques described in this disclosure.

FIG. 11 is a flowchart illustrating example operation of a network device, such as EAMS 12" of FIG. 6, in implementing a mass-customization advertisement aspect of the last mile online advertising techniques described in this disclosure. Initially, an inventory management module 166 of control unit 40" included within EAMS 12" may receive input from one of content providers 161 defining inventory via an API, which is represented in FIG. 10 as content provider interface 158 (171). Inventory management module 166 may store data defining this inventory to inventory database 162A.

Meanwhile, an ad management module 168 of control unit 40" may receive input via agency interface another API, which is represented in FIG. 10 as agency interface 160, where this input defines a mass-customizable advertisement in the manner described above (172). Ad management module 168 may store data defining this entered mass-customizable advertisement to ad database 162B. This form of advertisement may be referred to as "mass-customizable" in that the advertisement template for this form of advertisement may comprise customizable template regions that ad placement module 170 may customize in a large number of ways to suit a large number of target customers.

After storing inventory and at least this mass-customizable advertisement, EAMS 12" may receive via one of network interfaces 34" a network communication requesting an advertisement, as EAMS 12" is acting as a last mile ad network in this example (174). A last mile ad network may provide advertisements with lower latency while also more accurately profiling customer devices 18 in the manner described above. In any event, ad sourcing module 170 within control unit 40" of EAMS 12" may receive this communication and adaptively match an advertisement stored to ad database 162B to the inventory identified in the advertisement request (174).

For example, customer device 18A may request a webpage, for example, from content provider 161A that includes a reference to an available ad space. This available ad space may be assigned a unique identifier by inventory management module 166 when storing this inventory to inventory database 162A. Inventory management module 166 may return this identifier to content provider 161A, which may then embed this identifier in the webpage such that a web browser executing on customer device 18A may pass this identifier corresponding to this inventory to the ad network or, in this case, EAMS 12". Ad sourcing module 170 may receive this identifier, access the inventory identified by this identifier in inventory database 162A and retrieve any keywords or other context information concerning the identified inventory. Ad sourcing module 170 may utilize these keywords as well as access a profile for customer device 18A within profile database 30A' and adaptively select one of advertisements for this particular inventory based on the keywords and other profile data. In this manner, ad sourcing module 170 may adaptively match an advertisement to inventory identified in the communication (176).

Ad sourcing module 170 may further determine whether the selected advertisement is customizable or comprises a mass-customizable advertisement (178). Mass-customizable advertisements may be denoted within advertisement database with a flag or other distinguishing mark. If customizable ("YES" 178), ad sourcing module 170 may select template data associated with the mass-customizable advertisement based on the retrieved profile data for customer device 18A, as described above (180). Ad sourcing module 170 may then generate an advertisement from the advertisement template of the mass-customizable advertisement by populating the customizable template regions of the advertisement template with the selected template data, again as described above (182).

Whether customizable or not ("NO" 178), ad sourcing module 170 may then, in some instances, determine a type of placement for the advertisement (184). That is, ad sourcing module 170 may determine under what revenue model to place or source the advertisement, typically, by selecting between the CPM, CPC and CPA revenue module based on a level of interest with respect to the various regions of the AIDA model, as described above. After selecting this type of placement or ad revenue model, ad sourcing module 170 may return the matched advertisement under the determined placement or revenue model (186).

Figure 12:
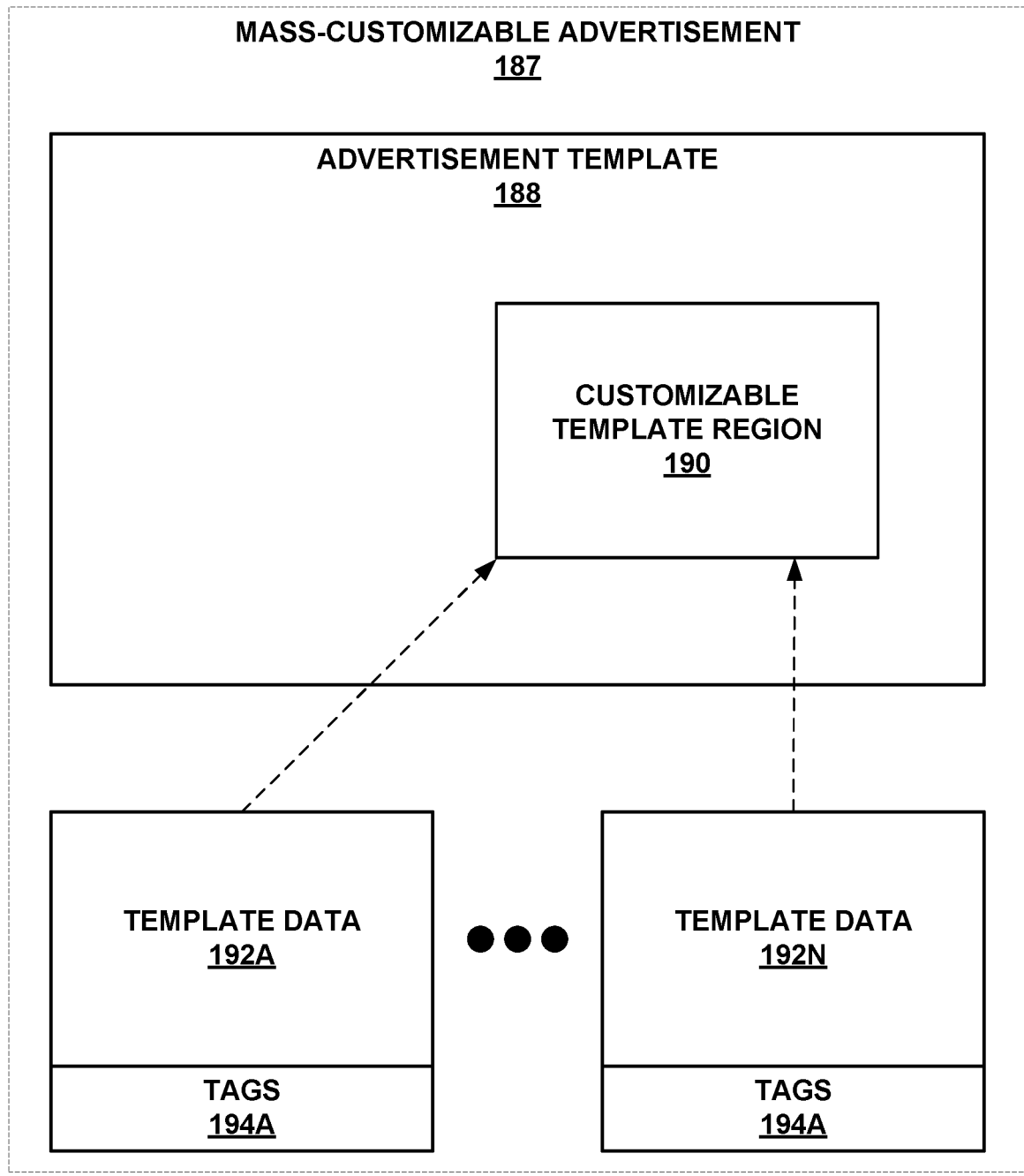
FIG. 12 is a block diagram illustrating an exemplary mass-customizable advertisement that a network device may dynamically adapt to target an individual customer.

FIG. 12 is a block diagram illustrating an exemplary mass-customizable advertisement 187 that a network device, such as EAMS 12", may dynamically adapt to target an individual customer. Mass-customizable advertisement 188 includes an advertisement template 188 having a customizable template region 190 and template data 192A-192N ("template data 192"). Each of template data 192 is associated with a respective one of tags 194A-194N ("tags 194"). Ad sourcing module 170 may select one of template data 192 to use when populating customizable template region 190 based on a comparison of respective tags 194 and profile data for a particular one of customer device 18 and possibly other information, such as keywords of a particular inventory. Ad sourcing module 170 may then generate an advertisement by populating customizable template region 190 with the selecting one of template data 192 and, as a result, effectively adapt the content of the advertisement to suit the one of customer devices 18. This customization may improve the effectiveness of advertisements.

Figure 13:
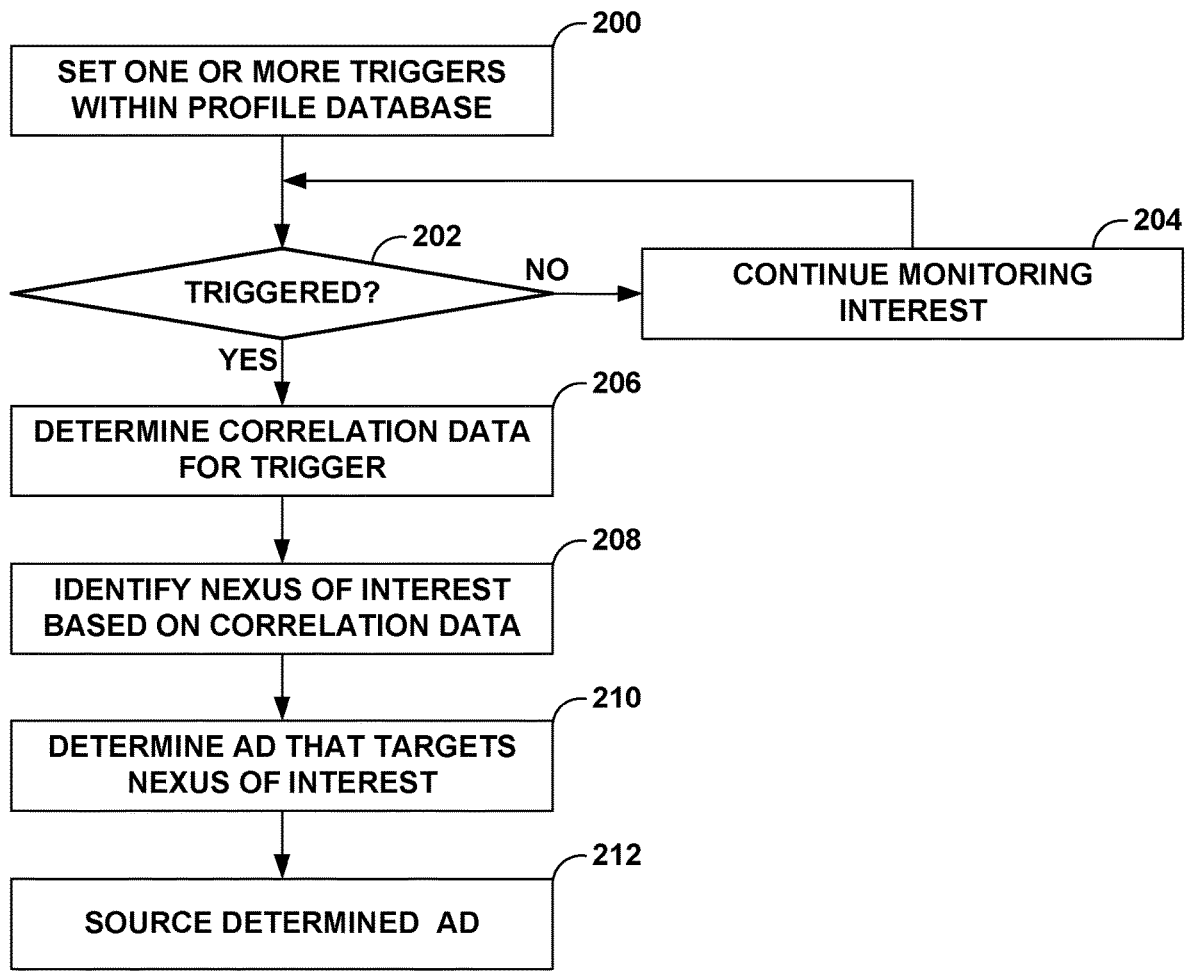
FIG. 13 is a flowchart illustrating example operation of a network device in implementing a cross-channel ad sourcing aspect of the last mile online advertising techniques described in this disclosure.

FIG. 13 is a flowchart illustrating example operation of a network device, such as EAMS 12" of FIG. 6, in implementing a cross-channel ad sourcing aspect of the last mile online advertising techniques described in this disclosure. Initially, ad management interface 168 of control unit 40" included within EAMS 12" may set one or more triggers within profile database 30A" (200). Ad management interface 168 may set these triggers in response to various interactions with ad agencies 92 to provide such services as cross-channel or -service ad sourcing.

Profile module 46" may, in this instance, continue to distill or otherwise consolidate history logs into profiles to monitor an interest of customers operating customer devices 18 in various categories, as described above. When updating these profiles, profile module 46" compare this interest level in each category to the triggers, which may represent benchmark levels of interest, to determine if the trigger has been triggered (202). If the interest level does not exceed the trigger ("NO" 202), profile module 46" may continue monitoring customer devices interest levels with respect to the above described categories and determining whether the triggers have been triggered (204, 202). If the level of interest for a particular category (and possibly within a set duration, e.g., a week) exceeds a trigger level, profile module 40" may determine the trigger is triggered ("YES" 202), which may cause profile module 40" to forward the communication that triggered the trigger to correlation module 100" included within correlation layer 42D" of control unit 40" but not shown in FIG. 10 for ease of illustration purposes.

Correlation module 100" may determine correlation data for the trigger by determining a correlation between the last communication that caused the trigger and subsequent communications that may be correlated with this last communication (206). Correlation module 100" may store this information to correlation database 86A" or otherwise make this information available to ad sourcing module 170. Ad sourcing module 170 may also then access this correlation information for the trigger within correlation database 86B" and identify a nexus of interest based on this correlation information (208). For example, ad sourcing module 170 may parse the correlation data looking for repeated references in the correlation data to similar product names, product types, serial numbers, product numbers, price ranges, categories, or any other identifiable characteristic for which an advertisement may be targeted. Ad sourcing module 170 may identify one or more of these nexuses of interest.

Ad sourcing module 170 may then determine an advertisement that targets the one or more nexuses of interest (210). Ad sourcing module 170 may next source the determined advertisement by forwarding the advertisement to the associated one of customer devices 18 for which the trigger was triggered (212). Often, ad sourcing module 170 may source the advertisement across channels in that ad sourcing module 170 may detect this interest via a number of different channels although primarily through a first channel, such as a data channel, but then source the advertisement through a channel other than the first channel, such as a mobile channel or email channel or even a standard mail channel as described above. This form of cross channel advertising is enabled as a result of EAMS 12" being located at the last mile rather than the first mile.

Figure 14:
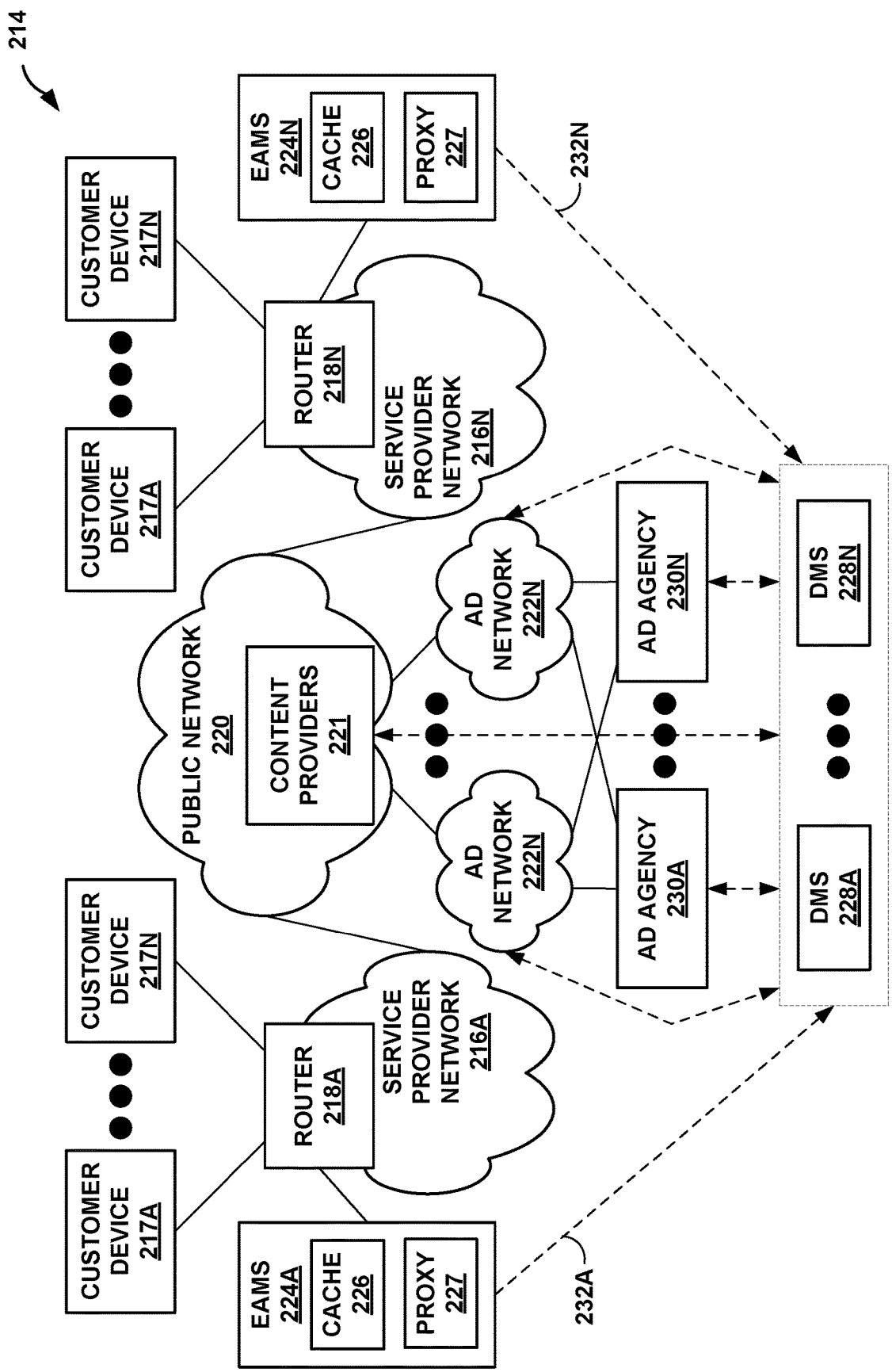
FIG. 14 is a block diagram illustrating a network system in which a number of network devices cooperatively implement one or more of the various aspects of the last mile online advertising techniques described in this disclosure.

FIG. 14 is a block diagram illustrating a network system 214 in which a number of network devices cooperatively implement one or more of the various aspects of the last mile online advertising techniques described in this disclosure. As shown in FIG. 14, network system 214 includes a plurality of service provider networks 216A-216N ("service provider networks 216") that each comprises a respective one of the plurality of routers 218A-218N ("routers 218"). Each of routers 216 may couple to a plurality of customer devices 217A-217N ("customer devices 217"), and each customer devices 217 may be substantially similar to customer devices 18 described above. Each of service provider networks 216 may be substantially similar to service provider network 16 described above, and each of routers 218 may be substantially similar to router 20 described above. Network system 214 also includes a public network 220 that may be substantially similar to public network 22 and each of service provider networks 216 may couple or otherwise provide access to public network 220. Public network 220 may also include content providers 221, which may be similar to content providers 161. Network system 214 further includes ad networks 222A-222N ("ad networks 222"), each of which may be substantially similar to ad network 26 described above. Ad networks 222 may couple to public network 220.

As further shown in the example of FIG. 14, network system 214 includes a plurality of EAMS 224A-224N ("EAMSes 224"), where each of EAMSes 224 couples to a respective one of routers 218. Each of EAMSes 224 also includes a cache 226. In this instance, EAMSes 224 are each assumed to operate as content proxies that cache content to respective ones of caches 226 in the manner described above. Moreover, EAMSes 224 may operate caches 226 as a large distributive cache in that EAMSes 224 may only cache content not cached to any other one of caches 226. When a request for content is received by one of EAMSes 224, this one of EAMSes 224 may first determine whether the content is cached locally in its cache 226. If not cached locally, this one of EAMSes 224 may issue a query requesting the content from those of EAMSes 224 proximate to the one of EAMSes 224 issuing the request, those of EAMSes 224 that this one of EAMSes 224 has learned as having the fastest response times to the query, or all of EAMSes 224. Typically, distributive caches, like that provided by EAMSes 224, may return content faster than a query to content providers 221 for the content. Commonly, when caching content, EAMSes 224 are also acting as content proxies and therefore EAMSes 224 are shown in FIG. 14 as including proxy modules 227 ("proxies 227"). Proxy modules 227 may perform the proxy functionality described above.

In any event, network system 214 may also include a plurality of Data Management Systems (DMS) 228A-228N ("DMSes 228") located remote from service provider networks 216. DMSes 228 manage the databases described above with respect to the various embodiments of EAMS 12, 12' and 12". In effect, DMSes 228 provide a central repository that is accessible by ad networks 222, ad agencies 230A-230N ("ad agencies 230") and content providers 221. EAMSes 224 may in this distributive version of the last mile online advertising techniques may parse the network communications over the various channels between customer devices 217 and content providers 221/ad networks 222. However, EAMSes 224 in this distributive instance may then forward the parsed information as history streams 232A-232N ("history streams 232") to DMSes 228, which may store this information to a history database similar to those described above. DMSes 228 may also include a profiler module similar to the profiler modules described above to condense the history logs formed from history streams 232N.

In effect, distributed EAMSes 224 may act as probes that provide last mile monitoring and data collection for upload as history steams 232 to DMSes 228. DMSes 228 may then profile large numbers of customers by monitoring the actions of customer devices 217, thereby enabling ad networks 222 and ad agencies 230 to determine trends among different geographical areas. Moreover, the large set of data may provide for more accurate targeting with less error due to the size of the sample. In any event, DMSes 228 may implement many of the aspects of the techniques described above with respect to EAMSes 224, although EAMSes 224 may still strip first mile cookies from the communications to preserve the identity of customer devices 18.

For example, DMSes 228 may distill or otherwise condense the history logs maintained for each of customer devices 217 into profiles. To retrieve a profile, ad networks 222 may interface with one or more of DMSes 228 to retrieve the profile in the manner described above with respect to EAMS 12'. DMSes 228 may also correlate clicks within the history logs with actions so as to support the CPA infrastructure and enable ad networks 222 to offer this CPA revenue model to ad agencies 230 even though content providers 221 may not support e-commerce or other action-tracking mechanisms, again as described above with respect to EAMS 12'. DMSes 228 may maintain a correlation database to store data related to these correlations, much as described above with respect to EAMS 12'. DMSes 228 may also generate metadata from this correlation data and maintain a metadata database similar to that described above with respect to EAMS 12'. DMSes 228 may expose an API similar to interface 160 described with respect to EAMS 12' with which ad agencies 230 may interface to access this metadata. DMSes 228 may also provide recommendations to ad networks 222 recommending a particular ad revenue model under which to place an ad in response to a request for the ad by one of customer devices 217. DMSes 228 may further, as another example, act as a large automated ad network that dynamically performs many of the above aspects to automatically serve advertisements on behalf of ad agencies 230 as described above with respect to EAMS 12".

In some instances, DMSes 228 may support additional services, such as real-time feeds of customer traffic. While any single one of EAMSes 224 may offer this same service, the smaller scale of a single EAMS providing data concerning a small number of customer devices 217 may not be as useful. DMSes 228 may provide this real-time streaming feed by correlating history streams 232 and providing this as a single stream to subscribers. DMSes 228 may offer this subscriptions at varying levels, where in one example, the levels provide real-time level 2 feeds similar to real-time level 2 stock feeds or 15-minute delayed feeds. In another example, these levels may vary by geographic location. In this respect, DMSes 228 may act as a Content Mediation Center (CMC) that mediates the delivery of information from sources to destinations.

With respect to the example of FIG. 14, the combination of EAMSes 224 and DMSes 228 may represent a service provider of service providers. That is, EAMSes 224 may operate to provide privacy for customers of a number of service provides, thereby acting as a privacy service provider for service providers. In addition, this combination may also act as a service provider for ad networks, content providers and ad agencies, as well as, acting as a stand-alone ad network comparable to and possibly more effective than ad networks 222, as this combination may more accurately profile and thereby target customers. Moreover, given that EAMSes 224 may be inserted anywhere within the network, this combination may easily scale to encompass customer devices 217 on a global scale, enabling a comprehensive profiling of every data consumer. This level of profiling may facilitate targeted advertising on an individual device basis while also enabling global consumer trend analysis.

Figure 15:
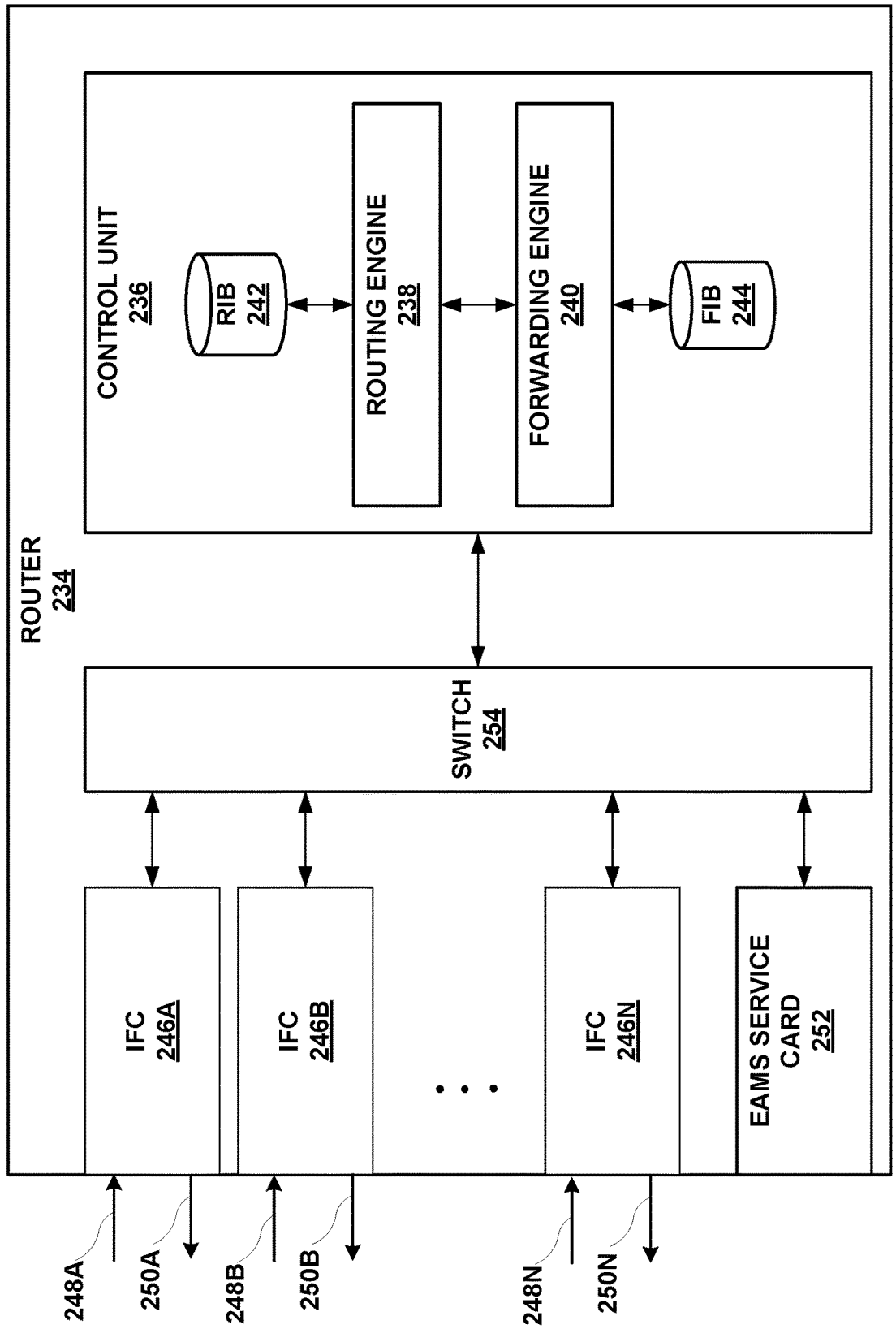
FIG. 15 is a block diagram illustrating an example embodiment of a router that implements one or more of the aspects of the last mile online advertising techniques described above.

FIG. 15 is a block diagram illustrating an example embodiment of a router 234 that implements one or more of the aspects of the last mile online advertising techniques described above. Although described with respect to router 234, any network device, such as a hub, switch, et cetera may implement the techniques described herein and the principles of the invention should not be limited to this exemplary embodiment.

As shown in FIG. 15, router 234 includes a control unit 236 that comprises a routing engine 238 and a forwarding engine 240. Control unit 236 may comprise one or more processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the functions described below.

Routing engine 238 may generally update routing information or link information stored within a database, shown in FIG. 15 as Routing Information Base 242 ("RIB 242"), to accurately reflect the topology of the network and other entities. In accordance with routing information stored in RIB 242, forwarding engine 240 may maintain forwarding information within FIB 244 that associates network destinations with specific next hops and corresponding interfaces ports. Routing engine 238 may install the determined path in forwarding engine 240, such that forwarding engine 250 may maintain FIB 244 in this manner.

Router 234 further includes a set of interface cards (IFCs) 246A-246N ("IFCs 246") for communicating packets via inbound links 248A-248N ("inbound links 248") and outbound links 250A-250N ("outbound links 250"). Router 234 may also include an Edge advertisement management system (EAMS) service card 252 ("EAMS service card 252"). Each of IFCs 246 and EAMS service card 252 couple to and communicate with control unit 236 via switch 254. Switch 254 may comprise any communication medium capable of communicatively coupling one or more endpoints, e.g., IFCs 246, control unit 236, and security card 252. Forwarding engine 240 may receive packets forwarded via switch 254 from IFCs 246 and forward those packets via switch 254 and IFCs 246 on outbound links 250 according to forwarding information stored to FIB 244. In this manner, forwarding engine 240 provides the forwarding functionality of router 234. EAMS service card 252 may represent a blade or other card that when coupled to control unit 234 may implement the various aspects of the techniques described above with respect to EAMSes 12, 12', 12" and one of EAMSes 224.

To illustrate, router 234 may receive the packets or more generally, network traffic, arriving via incoming links 248, whereupon IFCs 246 may forward those packets via switch 254 to forwarding engine 240. Routing engine 238 may flag, within FIB 244, all routes or only a portion of those routes corresponding to all of the traffic or only a portion of this traffic for interception and subsequent forwarding by forwarding engine 240. Forwarding engine 244 may therefore maintain information requiring that packets associated with particular flows, as one example, should be first sent to EAMS service card 252 prior to forwarding those packets via IFCs 246 and a corresponding one of outbound links 250.

Forwarding engine 240 may then forward these packets to EAMS service card 252 for processing or servicing in the manner described above. After servicing, EAMS service card 252 may forward the packets back to forwarding engine 240 via switch 254, whereupon forwarding engine 240 forwards the packets via one of IFCs 246 and a corresponding one of outbound links 250 associated with the determined path.

EAMS service card 252 may therefore comprise any card or other removable processing unit that may be inserted into a slot. EAMS service card 252 may, once inserted into the slot, interface with switch 254, whereby EAMS service card 252 may receive, service (e.g., implement one or more of the above described aspects of the last mile online advertising techniques described above) and forward packets. In this manner, any network device may implement the last mile online advertising techniques described herein.

Various embodiments of the invention have been described. These and other embodiments are within the scope of the following claims.

The invention claimed is:

1. A layer three (L3) router located at an edge of a service provider network and configured to communicate with a customer device to provide access to a public network, the L3 router comprising:
    a service card; and
    an interface card configured to receive a query from a network that sources communications in accordance with a plurality of models, including a cost-per-thousand impressions model, a cost-per-click model, and a cost-per-action model, via the public network, wherein the network is coupled to the service provider network by the public network and located remote from the service provider network, wherein the query specifies the customer device and one of the sourced communications, and requests that the service card select one of the models for the one of the sourced communications and the customer device specified by the query; and
    a switch configured to interconnect the service card and the interface card,
    wherein the service card comprises:
        a profile database configured to store data defining a profile for the one of the customer devices, the profile maintained anonymously from the perspective of the network sourcing the communications; and
        a control unit implemented using circuitry and configured to, in response to the query, analyze the profile data for the customer device to determine the selected one of the models for the specified one of the sourced communications with respect to the specified customer device, and
    wherein the interface card is further configured to send the selected one of the models to the network such that the network sources the communication to the customer device using the selected one of the models.

2. The L3 router of claim 1,
    wherein the interface card is further configured to receive request communications from the customer devices without the request communications being sent via the public network, the request communications requesting content from the network destination, and forward at least a portion of the network requests to the service card, and wherein the control unit analyzes the portions of the request communications to build the profile data within the profile database.

3. The L3 router of claim 2, wherein the control unit is further configured to:

parse the request communications requesting the content to extract application-layer data from the request network communications;

analyze the application-layer data extracted from the portions of the request network communications; and update the profile data for the customer device based on the analysis.

4. The L3 router of claim 3, wherein the profile data specifies a plurality of marketing categories and preference data that indicates an interest of one or more customers operating each of the customer devices for each of the marketing categories, and wherein the control unit is configured to:

analyze the application-layer data from the portions of the request communications to determine the preference data; and updates, for the customer device, the profile data with the determined preference data.

5. The L3 router of claim 3, wherein the control unit is configured to:

analyze the application-layer data from the portions of the request network communications to determine demographic information; and update the profile data to include demographic information for each of the customer devices.

6. The L3 router of claim 5, wherein the demographic information comprises:

a gender of the customer;

a preferred time of day during which the customer tends to shop online;

a geographic location of the customer;

an average monetary spend value for online services and goods for the customer;

a number of family members in a household of the customer;

an estimated age for the customer, and an gender of the customer.

7. The L3 router of claim 3, wherein the profile data specifies a plurality of marketing categories and, for each of the marketing categories, represents an interest for each of the customer devices to include RFM data having a recently component, a frequency component and a monetary component.

8. The L3 router of claim 1, wherein the control unit is further configured to execute:

a condensation services layer configured to process the customer communications from the edge network device and maintain a transaction log for the customer device of the service provider network, wherein the transaction log for the customer includes entries listing communications sourced by a network that are selected by a customer operating the customer device, wherein the sourced communications direct the customer device to a network destination when selected by the customer operating the customer device; and a correlation layer that correlates those of the customer communications committing to an action with any of the sourced communications previously presented to the customer.

9. The L3 router of claim 8, wherein the correlation layer is configured to maintain a correlation database of correlation data that associates the one of the sourced communications selected by the customer operating the customer device with the indication that the customer committed to the action.

10. The L3 router of claim 8, wherein the correlation layer comprises an application programming interface (API) by which the network sourcing the communications accesses the correlation data generated by the correlation layer.

11. The L3 router of claim 8, wherein the network destination resides in a first domain, and wherein the customer committed to the action via the content sourced by another network destination that resides in a second domain different from the first domain.

12. A method comprising:

receiving, by a service card installed within a L3 router located at an edge of a service provider network and configured to communicate with a customer device to provide access to a public network, a query from a network that sources communications in accordance with a plurality of models, including a cost-per-thousand impressions model, a cost-per-click model, and a cost-per-action model, via the public network, wherein the network is coupled to the service provider network by the public network and located remote from the service provider network, wherein the query specifies the customer device and one of the sourced communications, and requests that the service card select one of the models for the one of the sourced communications and the customer device specified by the query; and storing, by the service card, data defining a profile for the one of the customer devices, the profile maintained anonymously from the perspective of the network sourcing the communications; and analyzing, by the ES service card and in response to the query, the profile data for the one of the customer devices to determine the selected one of the models for the specified one of the sourced communications with respect to the specified customer device, and sending, by the service card, the selected one of the models to the network such that the network sources the communication to the customer device using the selected one of the models.

13. The method of claim 12, further comprising:

receiving request communications from the customer devices without the request communications being sent via the public network, the request communications requesting content from the network destination, and forward at least a portion of the network requests to the service card, and analyzing the portions of the request communications to build the profile data within the profile database.

14. The method of claim 13, further comprising:

parsing the request communications requesting the content to extract application-layer data from the request network communications;

analyzing the application-layer data extracted from the portions of the request network communications; and updating the profile data for the customer device based on the analysis.

15. The method of claim 14,
wherein the profile data specifies a plurality of marketing categories and preference data that indicates an interest of one or more customers operating each of the customer devices for each of the marketing categories,
wherein analyzing the application-layer data comprises analyze the application-layer data from the portions of the request communications to determine the preference data, and
wherein updating the profile data comprises updating, for the customer device, the profile data with the determined preference data.

16. The method of claim 14,
wherein analyzing the application-layer data comprises analyzing the application-layer data from the portions of the request network communications to determine demographic information, and
wherein updating the profile data comprises updating the profile data to include demographic information for each of the customer devices.

17. The method of claim 16, wherein the demographic information comprises:
a gender of the customer;
a preferred time of day during which the customer tends to shop online;
a geographic location of the customer;
an average monetary spend value for online services and goods for the customer;
a number of family members in a household of the customer;
an estimated age for the customer, and
an gender of the customer.

18. The method of claim 14, wherein the profile data specifies a plurality of marketing categories and, for each of the marketing categories, represents an interest for each of the customer devices to include RFM data having a recently component, a frequency component and a monetary component.

19. The method of claim 12, further comprising:
executing a condensation services layer configured to process the customer communications from the edge network device and maintain a transaction log for the customer device of the service provider network, wherein the transaction log for the customer includes entries listing communications sourced by a network that are selected by a customer operating the customer device, wherein the sourced communications direct the customer device to a network destination when selected by the customer operating the customer device; and
executing a correlation layer that correlates those of the customer communications committing to an action with any of the sourced communications previously presented to the customer.

20. The method of claim 19, wherein executing the correlation layer further comprises executing the correlation layer to maintain a correlation database of correlation data that associates the one of the sourced communications selected by the customer operating the customer device with the indication that the customer committed to the action.

21. The method of claim 19, wherein the correlation layer comprises an application programming interface (API) by which the network sourcing the communications accesses the correlation data generated by the correlation layer.

22. The method of claim 19,
wherein the network destination resides in a first domain, and
wherein the customer committed to the action via the content sourced by another network destination that resides in a second domain different from the first domain.

23. A non-transitory computer-readable storage medium having stored thereon instructions that, when executed, causes one or more processors included in a service card of a layer three (L3) router positioned at an edge of a service provider network to:
receive a query from a network that sources communications in accordance with a plurality of models, including a cost-per-thousand impressions model, a cost-per-click model, and a cost-per-action model, via a public network to which access is provided by the service provider network, wherein the network is coupled to the service provider network by the public network and located remote from the service provider network, wherein the query specifies a customer device and one of the sourced communications, and requests that the service card select one of the models for the one of the sourced communications and the customer device specified by the query; and
store, by the service card, data defining a profile for the one of the customer devices, the profile maintained anonymously from the perspective of the network sourcing the communications; and
analyze, by the service card and in response to the query, the profile data for the one of the customer devices to determine the selected one of the models for the specified one of the sourced communications with respect to the specified customer device, and
send, by the service card, the selected one of the models to the network such that the network sources the communication to the customer device using the selected one of the models.

* * * * *